US012667848B2

(12) United States Patent
Lipscomb et al.

(10) Patent No.: US 12,667,848 B2
(45) Date of Patent: *Jun. 30, 2026

(54) FUNCTIONALLY ENHANCED FLOURS, GRITS, AND FOOD PRODUCTS AND METHODS OF MAKING AND USING SAME

(71) Applicant: GHL Specialty Flours, LLC, Cedarburg, WI (US)

(72) Inventors: John M. Lipscomb, Cedarburg, WI (US); Omar I. Rodriguez, Cedarburg, WI (US); Chad C. Berge, Menomonee Falls, WI (US)

(73) Assignee: GHL Specialty Flours, LLC, Cedarburg, WI (US)

( * ) Notice: Subject to any disclaimer, the term of this patent is extended or adjusted under 35 U.S.C. 154(b) by 464 days.

This patent is subject to a terminal disclaimer.

(21) Appl. No.: 18/085,515

(22) Filed: Dec. 20, 2022

(65) Prior Publication Data

US 2023/0119644 A1 Apr. 20, 2023

Related U.S. Application Data

(63) Continuation of application No. 16/702,534, filed on Dec. 3, 2019, now Pat. No. 11,528,914.

(60) Provisional application No. 62/741,535, filed on Oct. 4, 2018, provisional application No. 62/740,950, filed on Oct. 3, 2018.

(51) Int. Cl.

| | |
|---|---|
| *A21D 6/00* | (2025.01) |
| *A21D 2/36* | (2006.01) |
| *A21D 13/06* | (2017.01) |
| *A23P 30/25* | (2016.01) |

(52) U.S. Cl.
CPC .............. *A21D 6/00* (2013.01); *A21D 2/362* (2013.01); *A21D 13/06* (2013.01); *A23P 30/25* (2016.08)

(58) Field of Classification Search
None
See application file for complete search history.

(56) References Cited

U.S. PATENT DOCUMENTS

| | | | |
|---|---|---|---|
| 3,579,352 A | 5/1971 | Bookwalter et al. | |
| 4,478,857 A | 10/1984 | Stauss | |
| 2007/0292583 A1 | 12/2007 | Haynes et al. | |
| 2010/0095899 A1 | 4/2010 | Lipscomb et al. | |
| 2014/0069344 A1 | 3/2014 | Lipscomb et al. | |
| 2014/0069345 A1 | 3/2014 | Lipscomb et al. | |
| 2014/0069346 A1 | 3/2014 | Lipscomb et al. | |
| 2014/0335323 A1 | 11/2014 | Lipscomb | |
| 2015/0145164 A1 | 5/2015 | Lipscomb | |
| 2015/0181832 A1 | 7/2015 | Lipscomb | |
| 2015/0181834 A1 | 7/2015 | Lipscomb | |
| 2015/0196005 A1 | 7/2015 | Lipscomb | |
| 2015/0238931 A1 | 8/2015 | Lipscomb et al. | |
| 2016/0165835 A1 | 6/2016 | Lipscomb et al. | |
| 2016/0214081 A1 | 7/2016 | Lipscomb | |
| 2016/0346981 A1 | 12/2016 | Lipscomb | |
| 2016/0362345 A1 | 12/2016 | Lipscomb | |
| 2017/0188540 A1* | 7/2017 | Lipscomb ............. B29C 48/911 |
| 2017/0245460 A1 | 8/2017 | Lipscomb et al. | |
| 2019/0350162 A1 | 11/2019 | Lipscomb et al. | |
| 2020/0163366 A1 | 5/2020 | Lipscomb et al. | |
| 2020/0296975 A1 | 9/2020 | Lipscomb et al. | |
| 2023/0028386 A1 | 1/2023 | Lipscomb | |

FOREIGN PATENT DOCUMENTS

| | | | |
|---|---|---|---|
| CN | 1357562 | 7/2002 | |
| CN | 1357562 A * | 7/2002 | |
| EP | 1656837 | 5/2006 | |
| JP | S62 143659 | 6/1987 | |
| JP | S62 208246 | 9/1987 | |
| RU | 2624956 C2 * | 7/2017 | ............. A23L 27/33 |
| WO | 9922607 | 5/1999 | |

OTHER PUBLICATIONS

"The stability and shelf life of food" by Subramaniam et al pp. 54-57 (Year: 2016).*
Ozcan, Serap and Jackson, David S., "Functionality Behavior of Raw and Extruded Corn Starch Mixtures" (2005). Faculty Publications in Food Science and Technology. 102.
Rheological properties of reactive extrusion modified waxy starch and waxy starch-polyacrylamide copolymer gels; Starch/Stärke 2013, 65, 984-990.
Chapter 1—General Overview of Food Hydrocolloids from Cellulose and Cellulose Derivatives in the Food Industry: Fundamentals and Applications, First Edition. Tanja Wustenberg. 2015 Wiley-VCH Verlag Gmbh & Co. KGaA. Published 2015 by Wiley-VCH Verlag Gmbh & Co. KGaA.
Hydrocolloids in Food Processing, Thomas R. Laaman, © 2011 Blackwell Publishing, Ltd. and Institute of Food Technologists, by Wiley-Blackwell IFT Press.

(Continued)

*Primary Examiner* — Jyoti Chawla
(74) *Attorney, Agent, or Firm* — Boyle Fredrickson, S.C.

(57) ABSTRACT

A flour made using an admixture composed of starch-containing grain, seed or fruit of a cereal grain or grain legume of low water content extruded in a single screw extruder at an ultra-high extrusion pressure producing an extruded functionally enhanced flour usable as an instantized flour by only adding water. When water is added, the flour forms a paste or dough that is three dimensionally formed or shaped into food products that can be cooked or baked in an oven into human or animal edible food products. The extruded functionally enhanced instantized flour also can be used as an ingredient in other edible food products. A preferred extruded functionally enhanced instant flour is extruded at ultra-high pressure from an admixture composed substantially completely of one or more cereal grains and/or legumes using only the moisture present in the cereal grains and/or legumes.

59 Claims, No Drawings

(56) References Cited

OTHER PUBLICATIONS

Chapter 1—The Role of Hydrocolloids in the Development of Food Structure: Food Chemistry, Function and Analysis No. 18 Handbook of Food Structure Development, Edited by Fotis Spyropoulos, Aris Lazidis and Ian T. Norton by The Royal Society of Chemistry 2020; Published by the Royal Society of Chemistry.

Majzoobi et al., Granular cold-water swelling starch; properties, preparation and applications, a review; Food Hydrocolloids 111 (2021) 106393.

Understanding and Measuring the Impact of Process Inputs on Degree of Cook in Starch-Based Systems, Bhimalingeswarappa Geera, 2009 Phd Thesis Dissertation at the University of Nebraska.

Soumya Banerjee & Suvendu Bhattacharya (2012) Food Gels: Gelling Process and New Applications, Critical Reviews in Food Science and Nutrition, 52:4, 334-346, DOI: 10.1080/10408398. 2010.500234.

Chapter 5—Application of Natural Polymers in Food; © Springer International Publishing Switzerland 2016; O. Olatunji (ed.), Natural Polymers, DOI 10.1007/978-3-319-26414-1_5.

Vallons et al., "Promoting Structure Formation by High Pressure in Gluten-Free Flours", LWT—Food Science and Technology, vol. 44, No. 7, Sep. 1, 2011, pp. 1672-1680.

Murekatete, Nicole et al., "Characterization of Ready-to-Eat Composite . . . ", Pakistan Journal of Nutrition, Feb. 1, 2020, pp. 171-178.

Licata, Rebecca et al., "Determination of Formulation and Processing Factors Affecting Slowly Digestible Starch . . . ", International Journal of Food Science and Technology, vol. 49, No. 5, Dec. 30, 2013.

Mahasukhonthachat K et al., "Kinetics of Starch Digestion and Functional Properties of Twin-Screw Extruded Sorghum", Journal of Cereal Science, Academic Press Ltd, GB, vol. 51, No. 3, May 1, 2010.

Physical and nutritional impact of fortification of corn starch-based extruded snacks with common bean (*Phaseolus vulgaris* L.) flour: Effects of bean addition and extrusion cooking, Food Chemistry, vol. 113, Issue 4, 2009, pp. 989-996, ISSN 0308-8146.

* cited by examiner

FUNCTIONALLY ENHANCED FLOURS, GRITS, AND FOOD PRODUCTS AND METHODS OF MAKING AND USING SAME

CROSS-REFERENCE TO RELATED APPLICATIONS

This application is a continuation of U.S. Non-Provisional patent application Ser. No. 16/702,534, filed Dec. 3, 2019 (and issued as U.S. Pat. No. 11,528,914 on Dec. 20, 2022), which claims priority in U.S. Provisional Patent Application Ser. No. 62/740,950, filed Oct. 3, 2018 and U.S. Provisional Patent Application Ser. No. 62/741,535, filed Oct. 4, 2018, the entirety of each of which is hereby expressly incorporated herein by reference.

FIELD OF THE INVENTION

The present invention relates to the field of food science. More particularly, the present invention relates to improved flours and grits along with methods of making and using same. The present invention also is directed to improved functional flours and grits having improved or enhanced functional characteristics as compared to conventional functional flours and grits.

BACKGROUND OF THE INVENTION

Flour has been a component of the food making process for many millennia, and conventional flour has long been made through grinding and milling of raw grains into a powder, which can later be used to help create a variety of food products. In particular, wheat and corn have had a long history of utilization around the world as a common source for flour.

The process to make conventional flour takes several steps and is rather time consuming as a result. Although most flour is made from wheat, other starchy plant foods, including barley, buckwheat, corn, lima beans, oats, peanuts, potatoes, soybeans, rice, sorghum and rye can be used. In making wheat flour, which is similar to the process used to make flour from other starchy plant foods, the wheat goes through steps to purify it before grinding to remove foreign debris and clean it. The purified wheat is then washed, typically in water, and dried, such as by spin-drying in a centrifuge, before conditioning or tempering is done to ensure moisture content is sufficient for its outer layer, the bran, is removed efficiently during grinding. Moisture is typically added during conditioning or tempering with the wheat typically soaked in water during conditioning or subjected to steam treatment where tempering is done. Vacuum drying is performed where too much moisture is absorbed during conditioning or tempering.

Depending on the type of flour desired, a blending step may be performed prior to grinding in order to mix wheat having different grades and moisture contents to obtain a batch ready for grinding that will produce flour having desired characteristics. For example, flour used to bake bread will be composed mainly or solely of hard wheat having a higher protein content of between 11%-18% protein and which contains more gluten, which are strong elastic proteins that form a network within dough made from the flour that traps leavening gases from yeast, baking powder, and other leavening agents. This helps the dough to rise, resulting in soft, light bread. Flour used to make cakes, pastries and other types of food products that do not need to rise as much as bread are typically made of soft wheat having a lower protein content of between 8%-11% as it contains less gluten. All-purpose flour is typically made of a mixture of hard wheat and soft wheat. Durum wheat is a special kind of hard wheat used to make semolina, a type of flour most commonly used to make pasta.

The batch of wheat can also be processed by an Entoleter, which subjects the wheat to impacts that typically kill and remove insects and eggs as well as remove any wheat that cracks during this process. Wheat that cracks is removed because it is considered unsuitable for grinding.

Grinding is typically performed by initially passing the wheat between a pair of breaker rolls of different sizes that rotate at different speeds that crack open the grains of wheat and begin to separate the interior of the wheat from the outer layer of bran. Metal sieves are used to separate what passes through the breaker rolls into three categories: middlings, semolina, and pieces of the interior attached to the bran. The middlings are then processed by a middlings purifier to remove pieces of bran while the remainder is passed through additional pairs of breaker rolls until a desired or sufficient amount of middlings is produced that are also sent to the middlings purifier.

After passing through the middlings purifier if finished, the middlings pass through a screen before being more finely ground between pairs of large, smooth metal rollers producing flour. The flour passes through sieves after each pass between the fine grinding rollers, which separates it into flours of different fineness. By sifting, separating, and regrinding the flour, several different grades of flour are produced at the same time. These are combined as needed to produce desired types of flour.

Where the flour is a whole grain flour, the multiple streams of middlings, semolina and bran are combined together before or after being finely ground. Where whole grain flour is made from grinding the whole or entire grain, it usually is done by grinding using millstones, e.g., stone-ground whole grain flour.

It is at this point that additives, such as bleaching agents and oxidizing agents, along with any needed vitamins, minerals, and the like, such as leavening agents and salt for self-rising flour, are usually added. The flour is then matured for one or two months before being packaged for retail sale.

Functional flours are defined as pre-cooked flour, fortified flour and specialty flour, which includes gluten-free, pregelatinized, enzyme treated, extruded and partially transformed flour with functional flour typically made by further processing of conventional flour and accounting for an ever-increasing share of the market. One common type of functional flour is an at least partially pregelatinized flour made by treating conventionally made flour by moistening it to increase its moisture content, e.g., increasing it to between 15-35% moisture content, subjecting the moistened flour to steam heating, e.g., for between 5 minutes and over an hour, including doing so under pressure, so it exits at a temperature of between 85° C.-90° C. (185° F.-194° F.), grinding it, and then drying it. Such hydrothermal heat treatment used to produce at least partially pregelatinized function flour can be done in a hydrothermal treatment apparatus, such as a pressure vessel, autoclave, or twin-screw extruder, where the moistened flour entering the treatment apparatus also is subjected to both steam and pressure.

While hydrothermally heat-treated functional flours have enjoyed substantial commercial success, improvements nonetheless remain desirable. Due to the relatively large number of preprocessing and processing steps, it can be complicated and costly to make functional flours.

Additionally, modern food and starch extrusion techniques used with such functional flours have focused on twin screw extruder applications that utilize relatively wet processing and relatively lower extrusion pressures with applied heat during extrusion in order to reduce the gelatinization point of the starch being extruded. Of course, because of the large increase in moisture, drying techniques using heat are typically used to drive off enough water to reduce the moisture content of the flour to a typical moisture content of between 12-14% to ensure adequate shelf life. Twin screw extruders typically utilized are also very long and involve relatively lengthy material processing times or residency times where the material being processed is treated within the twin screw extruder for at least 30 seconds before exiting the extruder. An additional drawback to present techniques is that the high water and hot environment of twin-screw extrusion causes the unnecessary and premature degradation of various ingredients and nutrients contained in the extrudate. This degradation results in, among other things, undesirable alterations in the flour's flavor and functionality for later food-making applications.

What is needed are functional flours and method of making functional flour that is simpler, less costly, while producing functional flours usable in making a wide variety of food products.

SUMMARY OF THE INVENTION

The present invention is based on the discovery that extruding whole cereal grains and/or comminuted cereal grains in a low water, high pressure, and low heat dynamic before flour milling can provide a functionally enhanced cereal grain-based flour, e.g., functional cereal grain-based flour of the present invention, having a variety of advantages over present flours, including at least one or more of: improved cold water starch solubility; reduced undesirable fiber content; lower water content; reduced flavor altering chemistries; stabilized, and relatively homogeneous nutrient and flavor profiles; utilizes the whole grain and is produced using a method of the present invention that eliminates at least a plurality of steps compared to conventional flour making processes and conventional functional flour making processes, as well as enhanced overall natural flavor profiles minimizing the necessity of using additional flavors.

In a first aspect, the present invention provides a functionally enhanced flour produced by extruding a cereal grain or cereal grain precursor having a water content of about 10% to about 15% at an extrusion pressure greater than about 1000 psi to yield a functionally enhanced flour with a final water content of about 4% to about 10%, preferably about 6% to about 8%, wherein: the extruding step is carried out without thermal input beyond heat generated from a changing pressure of extrudate; and the final water content is attained without a post-extrusion water reducing step.

In certain embodiments, the cereal grain or cereal grain precursor is a whole grain cereal grain. Alternatively, the cereal grain or cereal grain precursor is milled or otherwise comminuted, or is a mixture of whole and comminuted, e.g., milled, cereal grains.

The cereal grain or cereal grain precursor is, in certain embodiments, made of only a single cereal grain, such as corn, sorghum, or wheat. Alternatively, the cereal grain or cereal grain precursor is a mixture of two or more different types of cereal grains.

The cereal grain or cereal grain precursor can consist of only a whole cereal grain, milled cereal grain, or mixture thereof, or, alternatively, the cereal grain or cereal grain precursor includes additional ingredients including an additional cereal grain, legume(s), fruit(s), vegetable(s), whey, protein(s), such as protein isolate(s), vitamin(s), or mineral (s) and/or nutrient(s), such as micronutrient(s) and/or phytonutrient(s).

High extrusion pressures are characteristic of this invention, and cereal grain-based flours provided according to the invention are provided at, depending on the particular flour embodiment, extrusion pressure ranges of about 2000 psi to about 20,000 psi, about 5000 psi to about 15,000 psi, or about 7500 psi to about 12,500 psi. Various cereal grain-based flour embodiments utilize such ultrahigh extrusion pressures greater than about 2000 psi, greater than about 3000 psi, greater than about 4000 psi, greater than about 5000 psi, or greater than about 10,000 psi.

Certain embodiments of functionally enhanced cereal grain-based flour are reduced to a prescribed particle size distribution in a post-extrusion step.

Preferred cereal grain-based flour embodiments of the invention are extruded using a single screw extruder. The single screw extruder provides a manufacturing environment appropriate for achieving the low water, high pressure, and low heat dynamics critical to the present invention. In yet another aspect, the invention provides a functionally enhanced cereal grain-based flour for use in providing one or more of the following traits to a food product: cold water solubility in a food product; increasing water absorption in a food product; increasing water absorption swelling of a food product; increased water absorbed volume in a food product; increasing oil absorption in a food product; providing flavor stability in a food product; reducing one or more allergens in a food product; altering enzymatic activity in a food product; reducing enzymes in a food product; improving a flavor profile of a food product; increasing nutrient availability in a food product; reducing microbial activity in a food product; reducing fungal activity in a food product; and improving digestibility in the food product.

Yet another aspect of the invention encompasses a method of producing a functionally enhanced cereal grain-based flour, comprising: extruding a cereal grain or cereal grain precursor having a water content of about 10% to about 15% at an ultrahigh extrusion pressure greater than about 2000 psi to yield a functionally enhanced cereal grain-based flour with a final water content of about 4% to about 10%, preferably of about 6% to about 8%, and wherein the extruding step is carried out without thermal input beyond heat generated from a changing pressure of extrudate, and wherein the final water content is attained without a post-extrusion water reducing step.

In certain methods, the cereal grain or cereal grain precursor is a whole grain cereal grain. Alternatively, the cereal grain or cereal grain precursor is milled, or is a mixture of whole and milled cereal grain.

The cereal grain or cereal grain precursor is, in certain methods of the invention, made of only a single cereal grain. Alternatively, the cereal grain or cereal grain precursor is formed of or from a mixture of two or more cereal grains.

The cereal grain or cereal grain precursor can consist of only a whole cereal grain, milled cereal grain, or mixture thereof, or, alternatively, the cereal grain or cereal grain precursor includes additional ingredients including an additional cereal grain, legume, fruit, vegetable, whey, protein, such as a protein isolate, vitamin, or mineral and/or nutrient.

Ultrahigh extrusion pressures are characteristic of methods according to this invention, and functionally enhanced cereal grain-based flours of the present invention are accordingly formed or made at, depending on a particular functionally enhanced cereal grain-based flour embodiment, extrusion pressure ranges of about 2000 psi to about 20,000 psi, about 5000 psi to about 15,000 psi, or about 7500 psi to about 12,500 psi. Various functionally enhanced cereal grain-based flour embodiments utilize ultrahigh extrusion pressures greater than about 2000 psi, greater than about 3000 psi, greater than about 4000 psi, greater than about 5000 psi, or greater than about 10,000 psi.

Certain methods of the invention include a step of reducing the functionally enhanced cereal grain-based flour to a prescribed particle size distribution in a post-extrusion step.

Preferred methods according to the invention utilize a single screw extruder in the extrusion step in making a functionally enhanced cereal grain-based flour of the present invention.

In a preferred method of making a functional flour that is a functionally enhanced flour of the present invention, an admixture composed substantially completely of starch-containing grain, seed or fruit, preferably grain, seed or fruit of a cereal grain or grain legume, having a starch content of at least 35% by admixture weight, preferably at least 40% by admixture weight, and a moisture content of no greater than 25% by admixture weight, preferably between about 7% and about 18% by admixture weight, is introduced into a single screw extruder and extruded for a residency time within the extruder of no more than 15 seconds, preferably no more than 10 seconds, at an ultra-high internal extrusion pressure at a perforate extrudate exit die of the extruder of at least 2000 psi, preferably at least 4000 psi, and more preferably at least 5000 psi, without the addition of any water or moisture during extrusion, discharging granular or particulate extrudate from the extruder die having a moisture content of no more than 10%, preferably between 4% and 10% by extrudate weight, which is composed of particles or granules usable in its as-extruded form as a functional flour of the present invention, preferably usable in its as-extruded form as an instantized flour or instant flour of the present invention. If desired, the extruded functional flour granules of the present invention can be milled after extrusion into smaller sized functional flour particles of the present invention such that at least 90%, preferably at least 98%, of the milled functional flour particles of the present invention should pass through a 212-µsieve, e.g. a #70 US Standard Mesh screen.

In one preferred implementation of such a method of extruding functional flour, the residency time of the starch-containing grain, seed or fruit admixture within the single screw extruder operating at an ultra-high extrusion pressure is varied to change a flavor profile of the functional flour extruded with residency time increased to make more bland or reduce bitterness of the functional flour extruded from the extruder. In one such preferred method implementation, the residency time of the admixture within the single screw extruder is varied between about 4 seconds and about 15 seconds, preferably between 5 seconds and about 12 seconds, with the extruded functional flour having increased bitterness when residency time is shorter, such as between 4 seconds and 7 seconds, e.g., less than about 7 seconds residency time, and decreased bitterness when residency time is longer, such as between 8 seconds and 15 seconds, e.g., greater than about 8 seconds residency time.

The extruded instantized functional flour of the present invention is in a pregelatinized form when extruded from the extruder, does not retrograde, has a relatively low water activity, $a_w$, of less than 0.5, preferably less than 0.3, and which thereby has a relatively long shelf life when packaged in conventional flour packaging, e.g., paper flour packages, and stored at room temperature of at least 1 year, preferably at least 2 years, and more preferably at least 5 years.

Such an instantized extruded functional flour or instant extruded functional flour of the present invention is usable without performing any additional processing therewith or thereon and without requiring any additional ingredients, constituents, or substances needing to be mixed or blended therewith by simply only adding water for use. In use, water is added to the extruded functional flour in an amount sufficient for mixing the water with the flour to produce at least a paste and which can produce a dough, e.g., doughy mass, depending on the amount of water mixed with the flour, e.g., dependent on the ratio of water to flour. Mixing instantized extruded functional flour or instant extruded functional flour of the present invention with water at a ratio of 2 parts water to 1 part extruded functional flour produces a paste having a viscosity of at least about 4000 centipoise and no more than about 100,000 centipoise, preferably between 5000 and 50,000 centipoise. The resultant flour paste is a three-dimensionally formable flour paste that can be shaped or formed into a three-dimensionally contoured product, such as preferably formed into a chip, cracker, roll or cookie, while moist in paste form, which retains its three dimensionally contoured product shape while moist, before heating the three dimensionally contoured product to cook or bake it into a substantially hard and/or solid three dimensionally shaped edible food product, e.g. substantially hard and/or solid edible chip, cracker, roll or cookie. In a preferred method of making an edible food product, the flour paste is formed to have a desired three dimensional shape, e.g., formed into a three dimensional product, such as having the shape of a chip, cracker, roll or cookie, while a moist flour paste before being baked, such as in an oven, e.g., baking oven, at a temperature of at least 325 degrees Fahrenheit, preferably at least 400 degrees Fahrenheit, for at least five minutes, preferably at least ten minutes, more preferably for at least twenty minutes, until substantially hard, e.g., substantially uniformly cooked or baked throughout, forming a human edible food product, such as a chip, cracker, roll, or cookie, which preferably is crispy or crunchy.

Mixing instantized extruded functional flour or instant extruded functional flour of the present invention with water at a ratio of 1 part water to 1 part extruded functional flour produces a three-dimensionally formable dough having a viscosity of at least about 250,000 centipoise and no more than about 1,500,000 centipoise, preferably between 750,000 centipoise and 1,250,000 centipoise, and more preferably about 1,000,000 centipoise. The resultant flour dour is a three-dimensionally formable flour dough that can be shaped or formed into a three-dimensionally contoured product, such as preferably formed into a chip, cracker, roll or cookie, while moist in dough form, which retains its three dimensionally contoured product shape while moist, before heating the three dimensionally contoured product to cook or bake it into a substantially hard and/or solid three dimensionally shaped edible food product, e.g. substantially hard and/or solid edible chip, cracker, roll or cookie. In a preferred method of making an edible food product, the flour dough is formed to have a desired three dimensional shape, e.g., formed into a three dimensional product, such as having the shape of a chip, cracker, roll or cookie, while a moist flour dough before being baked, such as in an oven, e.g., baking oven, at a temperature of at least 325 degrees Fahrenheit, preferably at least 400 degrees Fahrenheit, for at least five minutes, preferably at least ten minutes, more preferably for at least twenty minutes, until substantially hard, e.g., substantially uniformly cooked or baked through-out, forming a human edible food product, such as a chip, cracker, roll, or cookie, which preferably is crispy or crunchy.

A further aspect of the invention is directed to a method of manufacturing a food product, the method including a step of incorporating into the food product a functionally enhanced cereal grain-based flour, e.g., a functional flour made in accordance with the present invention, as described and claimed herein to modify one or more qualities of the food product selected from the group consisting of: cold water solubility in said food product; reduced allergens in said food product, increased water absorption in said food product; increased water absorbed volume; increased water absorption swelling; oil absorption in said food product; decreased enzymatic activity in said food product; flavor stability in said food product; decreased plant-based enzymes in said food product; increased nutrient availability in said food product; decreased microbial activity in said food product; and reduced fungal activity in said food product.

A food product made with functionally enhanced cereal grain-based flour has increased water absorption capacity as such a functionally enhanced cereal grain-based flour made in accordance with the present invention absorbs up to six times its weight in water. A food product made with func-tionally enhanced cereal grain-based flour will take up a greater volume using a lesser amount of flour because such a functionally enhanced cereal grain-based flour made in accordance with the present invention occupies at least twice the volume as a conventional cereal grain flour when the same dry amount of flour is wetted with water. In a preferred embodiment, a food product, such as a sauce or gravy, made with functionally enhanced cereal grain-based flour will take up a greater volume using a lesser amount of flour because such a functionally enhanced cereal grain-based flour made in accordance with the present invention produces at least two and half times the volume, and preferably produces three times the volume that a conventional cereal grain flour does when the same dry amount of conventional cereal grain flour and the functionally enhanced cereal grain-based four are wetted with water.

A food product made with functionally enhanced cereal grain-based flour has an altered, preferably improved flavor profile, as a result of reduced enzymatic activity in the functionally enhanced cereal grain-based flour as compared to the same food product made with conventional cereal grain flour. Such reduced enzymatic activity is caused by a reduction in enzymes in the functionally enhanced cereal-grain based flour as compared to convention cereal grain flour. A preferred functionally enhanced cereal grain-based flour is extruded at an ultra-high extrusion pressure from an admixture having a water content, e.g., moisture content, of no greater than about 25%, preferably no greater than about 23%, by admixture weight that is composed substantially completely of the grains, preferably whole grains, of one or more cereal grains in a single-screw extruder such that starch in the grains of the cereal grain admixture is physi-cally modified during extrusion thereby reducing the number of enzymes in the grains by physical modification breaking the enzymes into smaller sized molecules having a reduced molecular weight.

A food product made with functionally enhanced cereal grain-based flour made in accordance with the present invention has an altered, preferably improved flavor profile, as a result of the functionally enhanced cereal-grain based flour having lesser amount of and/or reduced activity from plant-based phenols, flavonoids, isoflavones, terpenes, and glucosinolates, which improve taste and/or flavor because these are almost always bitter, acrid or astringent. Such a food product made with functionally enhanced cereal grain-based flour made in accordance with the present invention preferably also possesses reduced enzymatic activity in the functionally enhanced cereal grain-based flour as compared to the same food product made with conventional cereal grain flour and conventional cereal grain functional flour. Such reduced enzymatic activity is caused by a reduction in enzymes in the functionally enhanced cereal-grain based flour as compared to conventional cereal grain flour and conventional cereal grain functional flour.

A preferred functionally enhanced cereal grain-based flour is extruded at an ultra-high extrusion pressure from an admixture having a water content, e.g., moisture content, of no greater than about 25%, preferably no greater than about 23%, by admixture weight that is composed substantially completely of the grains, preferably whole grains, of one or more cereal grains in a single-screw extruder such that starch in the grains of the cereal grain admixture is physi-cally modified during extrusion thereby reducing the number of enzymes in the grains by physical modification breaking the enzymes into smaller sized molecules having a reduced molecular weight.

A food product made with functionally enhanced cereal grain-based flour has significantly reduced allergens, pref-erably reduced gluten, as compared to the same food product made with conventional cereal grain flour. Where the func-tionally enhanced cereal grain-based flour is composed of or includes wheat, the functionally enhanced cereal grain-based flour has at least fifty percent less, preferably at least seventy-five percent less and more preferably at least about eighty four percent less gluten than the wheat from which the functionally enhanced cereal grain-based flour was made. Where the functionally enhanced cereal grain-based flour is composed of wheat or includes wheat, the function-ally enhanced cereal grain-based flour has at least forty percent less, preferably at least fifty percent less and more preferably at least sixty percent less gluten than a conven-tional wheat-containing cereal grain flour.

The invention further encompasses a food product that includes a functionally enhanced cereal grain-based flour as described and claimed herein and at least one non-flour food ingredient.

The present invention is based on the related additional discovery that extruding whole wheat and/or comminuted wheat in a low water, high pressure, and low heat dynamic before flour milling can provide a functional wheat-based flour having improved or enhanced functional characteris-tics compared to conventional wheat flours.

In a first aspect, the present invention provides a func-tionally enhanced wheat-based flour produced by extruding a starch-containing admixture composed of at least fifty percent wheat or wheat precursor by admixture weight having a water content of about 10% to about 15% at an ultrahigh extrusion pressure greater than about 2000 psi to yield a functionally enhanced wheat-based flour with a final water content of about 4% to about 10%, preferably about 6% to about 8%, wherein: the extruding step is carried out without thermal input beyond heat generated from a chang-ing pressure of extrudate; and the final water content is attained without a post-extrusion water reducing step.

In certain embodiments, the wheat or wheat precursor is a whole grain wheat, e.g., whole wheat. Alternatively, the wheat or wheat precursor is milled or otherwise comminuted, or is a mixture of whole and comminuted, e.g., milled, wheat.

The wheat or wheat precursor is, in certain embodiments, made of only a single type of wheat, such as common wheat, triticale, Triticum wheat, Einkorn wheat, Khorasan wheat, spelt, or Emmer. Alternatively, the wheat or wheat precursor is a mixture of two or more of these different types of wheat.

The wheat or wheat precursor can consist of only a whole wheat, milled wheat, or mixture thereof, or, alternatively, the wheat or wheat precursor includes additional ingredients including one or more different types of cereal grains, legumes, fruits, vegetables, whey, proteins, such as protein isolates, vitamins, or minerals and/or nutrients, such as micronutrients and/or phytonutrients.

Ultrahigh extrusion pressures are characteristic of this invention, and wheat-based flours provided according to the invention are provided at, depending on the particular functionally enhanced wheat-based flour embodiment, ultrahigh extrusion pressure ranges of about 2000 psi to about 20,000 psi, about 5000 psi to about 15,000 psi, or about 7500 psi to about 12,500 psi. Various wheat-based flour embodiments utilize such ultrahigh extrusion pressures greater than about 2000 psi, greater than about 3000 psi, greater than about 4000 psi, greater than about 5000 psi, or greater than about 10,000 psi.

Certain embodiments of functionally enhanced wheat-based flour are reduced to a prescribed particle size distribution in a post-extrusion step.

Preferred wheat-based flour embodiments of the invention are extruded using a single screw extruder at an aforementioned ultrahigh extrusion pressure or ultrahigh extrusion pressure range. The single screw extruder provides a manufacturing environment appropriate for achieving the low water, high pressure, and low heat dynamics critical to the present invention. In yet another aspect, the invention provides a functionally enhanced wheat-based flour for use in providing one or more of the following traits to a food product: cold water solubility in a food product; increasing water absorption in a food product; increasing water absorption swelling of a food product; increased water absorbed volume in a food product; altering an enzymatic profile in a food product; reducing enzymatic activity in a food product; increasing oil absorption in a food product; providing flavor stability in a food product; reducing one or more allergens in a food product; increasing nutrient availability in a food product; reducing microbial activity in a food product; reducing fungal activity in a food product; and improving digestibility in the food product.

Yet another aspect of the invention encompasses a method of producing a functionally enhanced wheat-based flour, comprising: extruding a wheat or wheat precursor having a water content of about 10% to about 15% at an ultrahigh extrusion pressure greater than about 2000 psi to yield a functionally enhanced wheat-based flour with a final water content of about 4% to about 10%, preferably of about 6% to about 8%, wherein: the extruding step is carried out without thermal input beyond heat generated from a changing pressure of extrudate; and the final water content is attained without a post-extrusion water reducing step.

A preferred functional flour embodiment and functional flour making process of the present invention is based on the discovery that extrusion of an admixture substantially completely composed of whole grains, preferably whole grains of one or more cereal grains, having a moisture content of no greater than 25% using a single screw extruder operating at an extrusion temperature of at least 135° Celsius and at an ultrahigh extrusion pressure of at least 2000 PSI for a residency time within the single screw extruder no greater than 10 seconds, preferably no greater than about 7 seconds, and extrusion produces granular extrudate, e.g., extruded granules, suitable for use as a functional flour in its as-extruded state or condition. Such a functional flour embodiment and functional flour making process of the present invention produces extruded functional flour from such whole grains of one or more cereal grains without the whole grains of the admixture having been previously subjected to any prior grinding or milling steps typically required of conventional functional flours and functional flour making processes. If desired, the extruded functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen In one such preferred functional flour embodiment and functional flour making process of the present invention, an admixture composed substantially of whole grains of one or more cereal grains having a moisture content no greater than about 20% is extruded using a single screw extruder at an extrusion temperature of at least 125° Celsius and at an ultrahigh extrusion pressure of at least 2000 PSI without any steam or moisture added to the admixture in the extruder during extrusion for a residency time within the extruder of no more than about 7 seconds before exiting the extruder producing granular extrudate composed of at least 10%, preferably at least 15% cold water soluble starch by granular extrudate weight formed during extrusion usable as functional grits or functional flour preferably without any post-extrusion grinding or milling performed thereon after extrusion. In another such preferred functional flour embodiment and functional flour making process of the present invention, an admixture composed substantially of whole grains of one or more cereal grains having a moisture content no greater than about 20% is extruded using a single screw extruder at an extrusion temperature of at least 125° Celsius and at an ultrahigh extrusion pressure of at least 2000 PSI without any steam or moisture added to the admixture in the extruder during extrusion for a residency time within the extruder of no more than about 7 seconds before exiting the extruder producing an instantized granular extrudate, e.g., instantized extruded granules, composed of at least 10% and preferably at least 15% cold water soluble starch by granular extrudate weight formed during extrusion usable as instantized functional grits or instantized functional flour. If desired, the extruded functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen.

In one such preferred functional flour embodiment and functional flour making process of the present invention, an admixture composed substantially of whole grains of one or more cereal grains having a moisture content no greater than about 20% is extruded using a single screw extruder at an extrusion temperature of at least 125° Celsius and at an ultrahigh extrusion pressure of at least 2000 PSI without any steam or moisture added to the admixture in the extruder during extrusion for a residency time within the extruder of no more than about 7 seconds before exiting the extruder producing granular extrudate, preferably in the form of grit-sized extruded functional flour granules, composed of cold water soluble starch formed during extrusion usable as functional grits or functional flour without any post-extrusion grinding or milling performed on the extrudate. If desired, the extruded grit-sized functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen.

In certain methods, the wheat or wheat precursor is a whole grain wheat or whole wheat. Alternatively, the wheat or wheat precursor is milled, or is a mixture of whole and milled wheat.

The wheat or wheat precursor is, in certain methods of the invention, made of only a single type of wheat. Alternatively, the wheat or wheat precursor is formed of or from a mixture of two or more types of wheat. Where formed of a mixture of two or more types of wheat, the wheat or wheat precursor can be formed of two or more of common wheat, triticale, a triticum wheat, spelt, Einkorn wheat, Khorasan wheat or Emmer.

The wheat or wheat precursor can consist of only a whole grain wheat, e.g., whole wheat, milled wheat, or mixture thereof, or, alternatively, the wheat or wheat precursor includes additional ingredients including an additional different type of cereal grain, legume, fruit, vegetable, whey, protein, such as a protein isolate, vitamin, or mineral and/or nutrient. Where the additional ingredients include an additional cereal grain, such additional suitable cereal grains include corn and/or sorghum.

Ultrahigh extrusion pressures are characteristic of methods according to this invention, and functionally enhanced wheat-based flours of the present invention are accordingly formed or made at, depending on particular functionally enhanced wheat-based flour embodiment, ultrahigh extrusion pressure ranges of about 2000 psi to about 20,000 psi, about 5000 psi to about 15,000 psi, or about 7500 psi to about 12,500 psi. Various functionally enhanced cereal grain-based flour embodiments utilize ultrahigh extrusion pressures greater than about 2000 psi, greater than about 3000 psi, greater than about 4000 psi, greater than about 5000 psi, or greater than about 10,000 psi.

Certain methods of the invention include a step of reducing the functionally enhanced wheat-based flour to a prescribed particle size distribution in a post-extrusion step.

Preferred methods according to the invention utilize a single screw extruder in the extrusion step.

A further aspect of the invention is directed to a method of manufacturing a food product, the method including a step of incorporating into the food product a functionally enhanced wheat-based flour as described and claimed herein to modify one or more qualities of the food product selected from the group consisting of: cold water solubility in said food product; reduced allergens in said food product, water absorption in said food product; increased water absorbed volume; increased water absorption swelling; improved enzyme activity; reduced enzymes; oil absorption in said food product; flavor stability in said food product; improved flavor profile; nutrient availability in said food product; microbial activity in said food product; and reduced fungal activity in said food product.

A food product made with functionally enhanced wheat-based flour has increased water absorption capacity as such a functionally enhanced wheat-based flour made in accordance with the present invention absorbs up to six times its weight in water. A food product made with functionally enhanced wheat-based flour will take up a greater volume using a lesser amount of flour because such a functionally enhanced wheat-based flour made in accordance with the present invention occupies at least twice the volume as a conventional wheat flour when the same dry amount of each type of flour is wetted with water. In a preferred embodiment, a food product, such as a sauce or gravy, made with functionally enhanced wheat-based flour will take up a greater volume using a lesser amount of flour than conventional wheat flour because such a functionally enhanced wheat-based flour made in accordance with the present invention produces at least two and half times the volume, and preferably produces three times the volume that a conventional wheat flour does when the same dry amount of conventional wheat flour and the functionally enhanced wheat-based flour are wetted with the same amount of water.

A food product made with functionally enhanced wheat-based flour has an altered, preferably improved flavor profile, because of reduced enzymatic activity in the functionally enhanced wheat-based flour as compared to the same food product made with conventional wheat flour. Such reduced enzymatic activity is caused by a reduction in enzymes in the functionally enhanced wheat-based flour as compared to conventional wheat flour.

A food product made with functionally enhanced wheat-based flour has significantly reduced allergens, preferably reduced gluten, as compared to the same food product made with conventional wheat flour. Such a functionally enhanced wheat-based flour contains at least fifty percent less, preferably at least seventy-five percent less, and more preferably at least about eighty four percent less gluten than the wheat from which the functionally enhanced wheat-based flour was made. Such a functionally enhanced wheat-based flour also advantageously contains at least forty percent less, preferably at least fifty percent less and more preferably at least sixty percent less gluten than a conventional wheat flour.

The invention further encompasses a food product that includes a functionally enhanced wheat-based flour as described and claimed herein and at least one non-flour food ingredient.

The present invention is based on the further discovery that extruding whole legumes and/or comminuted legumes in a low water, high pressure, and low heat dynamic before flour milling can provide a functional legume-based flour having a variety of advantages over present flours, including at least one or more of: improved cold water starch solubility; reduced undesirable fiber content; lower water content; reduced flavor altering chemistries; increased water absorbed swelling; increased water absorbed volume; reduced allergens; altered enzymatic activity; improved enzymatic activity; decreased enzymes; improved flavor profile; stabilized, and relatively homogeneous nutrient and flavor profiles; as well as enhanced overall natural flavor profiles minimizing the necessity of using additional flavors.

In a first aspect, the present invention provides a functionally enhanced legume-based flour produced by extruding a legume or legume precursor having a water content of about 10% to about 15% at an extrusion pressure greater than about 1000 psi to yield a functionally enhanced flour with a final water content of about 4% to about 10%, wherein: the extruding step is carried out without thermal input beyond heat generated from a changing pressure of extrudate; and the final water content is attained without a post-extrusion water reducing step.

In certain embodiments, the legume or legume precursor is a whole legume, e.g., a whole grain legume. Alternatively, the legume or legume precursor is milled or otherwise comminuted, or is a mixture of whole and comminuted, e.g., milled, legumes.

The legume or legume precursor is, in certain embodiments, made of only a single legume. Alternatively, the legume or legume precursor is a mixture of two or more different types of legumes, such as two or more of lentils, chickpeas, peas, lupins and beans, such as butter beans, haricot (navy) beans, cannellini beans, red kidney beans, adzuki beans, black-eyed beans, and soybeans.

The legume or legume precursor can consist of only a whole legume, milled legume, or mixture thereof, or, alternatively, the legume or legume precursor includes additional ingredients including an additional legume, cereal grain, fruit, vegetable, whey, proteins, such as protein isolates, vitamins, or mineral and nutrients.

High extrusion pressures are characteristic of this invention, and flours provided according to the invention are provided at, depending on particular flour embodiment, pressure ranges of about 2000 psi to about 20,000 psi, about 5000 psi to about 15,000 psi, or about 7500 psi to about 12,500 psi. Various embodiments utilize extrusion pressures greater than about 2000 psi, greater than about 3000 psi, greater than about 4000 psi, greater than about 5000 psi, or greater than about 10,000 psi.

Certain embodiments of functionally enhanced flour are reduced to a prescribed particle size distribution in a post-extrusion step.

Preferred flour embodiments of the invention are extruded using a single screw extruder. The single screw extruder provides a manufacturing environment appropriate for achieving the low water, high pressure, and low heat dynamics critical to the present invention. In yet another aspect, the invention provides a functionally enhanced flour for use in providing one or more of the following traits to a food product: cold water solubility in a food product; increasing water absorption in a food product; increasing oil absorption in a food product; providing flavor stability in a food product; increasing nutrient availability in a food product; reducing microbial activity in a food product; reducing fungal activity in a food product; and improving digestibility in the food product.

Yet another aspect of the invention encompasses a method of producing a functionally enhanced flour, comprising: extruding a legume or legume precursor having a water content of about 10% to about 15% at an extrusion pressure greater than about 1000 psi to yield a functionally enhanced flour with a final water content of about 4% to about 10%, wherein: the extruding step is carried out without thermal input beyond heat generated from a changing pressure of extrudate; and the final water content is attained without a post-extrusion water reducing step.

In certain methods, the legume or legume precursor is a whole legume. Alternatively, the legume or legume precursor is milled, or is a mixture of whole and milled legume.

The legume or legume precursor is, in certain methods of the invention, made of only a single legume. Alternatively, the legume or legume precursor is a mixture of two or more legume.

The legume or legume precursor can consist of only a whole legume, milled legume, or mixture thereof, or, alternatively, the legume or legume precursor includes additional ingredients including an additional legume, cereal grain, fruit, vegetable, whey, proteins, such as protein isolates, vitamins, or mineral and nutrients.

High extrusion pressures are characteristic of methods according to this invention, and flours are accordingly provided at, depending on particular flour embodiment, extrusion pressure ranges of about 2000 psi to about 20,000 psi, about 5000 psi to about 15,000 psi, or about 7500 psi to about 12,500 psi. Various embodiments utilize extrusion pressures greater than about 2000 psi, greater than about 3000 psi, greater than about 4000 psi, greater than about 5000 psi, or greater than about 10,000 psi.

Certain methods of the invention include a step of reducing the flour to a prescribed particle size distribution in a post-extrusion step.

Preferred methods according to the invention utilize a single screw extruder in the extrusion step.

A further aspect of the invention is directed to a method of manufacturing a food product, the method including a step of incorporating into the food product a functionally enhanced flour as described and claimed herein to modify one or more qualities of the food product selected from the group consisting of: cold water solubility in said food product; water absorption in said food product; oil absorption in said food product; flavor stability in said food product; nutrient availability in said food product; microbial activity in said food product; and fungal activity in said food product.

A food product made with functionally enhanced legume-based flour has increased water absorption capacity as such a functionally enhanced legume-based flour made in accordance with the present invention absorbs up to six times its weight in water. A food product made with functionally enhanced legume-based flour will take up a greater volume using a lesser amount of flour as compared to conventional flour because such a functionally enhanced legume-based flour made in accordance with the present invention occupies at least twice the volume as a conventional legume flour when the same dry amount of each type of flour is wetted with the same amount of water. In a preferred embodiment, a food product, such as a sauce or gravy, made with functionally enhanced legume-based flour will take up a greater volume using a lesser amount of flour than conventional legume flour because such a functionally enhanced legume-based flour made in accordance with the present invention produces at least two and half times the volume, and preferably produces three times the volume that a conventional legume flour does when the same dry amount of conventional legume flour and the functionally enhanced legume-based flour are wetted with water.

A food product made with functionally enhanced legume-based flour has an altered, preferably improved flavor profile, as a result of reduced enzymatic activity in the functionally enhanced legume-based flour as compared to the same food product made with conventional legume flour. Such reduced enzymatic activity is caused by a reduction in enzymes in the functionally enhanced legume-based flour as compared to conventional flour.

A food product made with functionally enhanced wheat-based flour has significantly reduced allergens, preferably reduced gluten, as compared to the same food product made with conventional wheat flour. Such a functionally enhanced wheat-based flour contains at least fifty percent less, preferably at least seventy-five percent less, and more preferably at least about eighty four percent less gluten than the wheat from which the functionally enhanced wheat-based flour was made. Such a functionally enhanced wheat-based flour also advantageously contains at least forty percent less, preferably at least fifty percent less and more preferably at least sixty percent less gluten than a conventional wheat flour.

The invention further encompasses a food product that includes a functionally enhanced flour as described and claimed herein and at least one non-flour food ingredient. The invention can further encompass a food product composed alone of grits as well as a food product composed of such grits and at least one non-grit and/or non-flour food ingredient.

Functionally enhanced flour or grits of the present invention is made by extrusion in a single screw extruder that causes pre-gelatinization and simplified post-gelatinization characteristics of whole grain and whole legume seed contents with expanded material content access while minimizing reactive and restrictive processing elements, which is all accomplished within an operational period or extruder residency time that is measured in seconds. In a preferred method of making functionally enhanced flour or grits of the present invention using ultrahigh pressure extrusion, the cereal grain and/or legume admixture passes through the single extruder in no more than 10 seconds and preferably no more than about 5-7 seconds such that extruder residency time is no more than 10 seconds and preferably no more than about 5-7 seconds.

Preferably, ultrahigh extrusion pressure of at least 2000 psi is utilized to gelatinize an admixture comprised of cereal grain and/or legume(s), e.g. cereal grain seed and/or legume seed, contents without the direct addition of other materials, heat, or water to the admixture. While utilizing the natural water content already contained within the cereal grain and/or legume(s), pressure is the matrix factor that is maximized, with absolute minimization of all other factorial influences that previous manufacturing methods have focused on in excessive amounts, such as water and heat. Those excessive amounts require additional equipment and energy just to bring the processed material, e.g., conventional flour or grits, back into a more desirable and usable state, while at the same time causing a loss of some functionally desirable properties of the material in the process.

As the screw progresses during extrusion of the functionally enhanced flour or grits, the cereal grain and/or legume(s) admixture comes under increasing pressure, which can and preferably does cause some mechanical cutting or mechanical grinding of the admixture, the solid state phase of the cereal grain and/or legume admixture shifts and the admixture begins to gelatinize (enters a more molecularly mobile, heavy liquid phase) within the single screw extruder. Mixing of the contents of the admixture by the screw of the extruder while in such a molecularly mobile gelatinous, e.g., gelatinized, state helps to homogenize the gelatinized material within the extruder to an extent, which in turn also causes protein in the gelatinized material from the cereal grain and/or legumes in the admixture to lose their tertiary and quaternary structures. Such tertiary and quaternary structures of these proteins of the cereal grain and/or legumes of the admixture and gelatinized material formed within the extruder during extrusion are the weakly bonded fold arrangements that allow the proteins to carry out specific functions. Thus, proteins of the cereal grains and/or legumes of the admixture and/or gelatinized material within the extruder are denatured while in the extruder under ultrahigh extrusion pressures, modifying those proteins into a form, e.g., folded shape or physical arrangement, which makes the ultrahigh pressure extrusion modified proteins unable to carry out their original functions, leading to enzyme deactivation and flavor neutrality, while also increasing protein digestibility.

Upon exiting the die of the extruder, the transition from ultrahigh extrusion pressure to atmospheric pressure allows water within the gelatinized material exiting the die to shift from a liquid state into a vapor state, resulting in vaporized steam pressure arising in the molecularly mobile gelatinous state of the gelatinized material exiting the extruder and expanding the contents of the gelatinized material. Pressure is released from the gelatinized material exiting the extruder, water is evaporated from the gelatinized material exiting the extruder, the gelatinized material exiting the extruder is expanded, and the gelatinized material exiting the extruder immediately solidifies in the expanded state as it exits the extruder in the form of extrudate. This extrudate can be and typically is further reduced to a desired particle size, such as by cutting, crushing, grinding and/or via another comminution process.

If desired, the extruded functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen.

Benefits of such a method include:

a very low water state that prevents retrogradation of the starch in the extrudate;

minimized chemical changes due to the lack of applied heat, water, and chemicals;

instant cold water gelatinizability or instant cold water solubility;

contained enzyme deactivation (note: conformational change is not the same as a chemical reaction change, although some extent of large molecular cleavage is likely)

flavor neutrality;

more rapid access to nutrients by water and digestive enzymes; and/or more rapid access to nutrients by water and digestive enzymes.

Other objects, features and advantages of the present invention will become apparent after review of the specification, claims and drawings. The detailed description and examples enhance the understanding of the invention but are not intended to limit the scope of the appended claims.

DETAILED DESCRIPTION OF THE INVENTION

I. In General

Before the present materials and methods are described, it is understood that this invention is not limited to the particular methodology, protocols, materials, and reagents described, as these may vary. It is also to be understood that the terminology used herein is for the purpose of describing particular embodiments only and is not intended to limit the scope of the present invention, which will be limited only by the appended claims.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. All publications and patents specifically mentioned herein are incorporated by reference for all purposes including describing and disclosing the ingredients, reagents, chemicals, devices, manufactures, statistical analysis and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

II. The Invention

The present invention is based on the inventor's discovery that extruding whole grains or milled grains in a low water, high pressure, and low heat dynamic can provide a functional flour having a variety of advantages over present flours, including one or more of: improved cold water starch solubility; reduced undesirable fiber content; lower water content; reduced flavor altering chemistries; stable nutrient, flavor additions that are relatively homogeneous, enhance flavors, improves digestibility and lowers bacterial and fungal activity.

Not adopting any one mode of operation herein, the present invention takes advantage of the phasing characteristics of water and starch under high extrusion pressures, particularly those achieved in a single screw extruder. The converted pressure drop observed under the present inventive methods provides enough energy to evaporate a portion of the water contained in the grain precursor and eliminates the need for added heating elements during the extrudate step of flour manufacture. While a minimal heat release is experienced in the pressure conversion, that heat is short lived in the process, and the reduced water content allows for near instant solidification of starch contained in the grain precursor that has been expanded by the vaporized water at the die of the extruder. This high-pressure technique of extrusion as a flour precursor provides an improved approach to flour manufacturing methodology. Performing the inventive methods described herein with a single screw extruder, versus the typically-used twin screw extruder, limits the length of time that gelatinization takes place and minimizes adverse consequences on the extruded material. In fact, typical extrusion equipment used in food manufacturing have not operated at the high pressures, low temperature or low water activity utilized by the present invention. The manufacturing conditions described herein are outside the normal expectation or application of present-day food manufacturing equipment.

While the present inventive methods may utilize a singular grain as a precursor grain, certain embodiments of the invention encompass functional flours provided by methods that include a pre-extrusion mixing of various other food elements with the grain, typically in a dehydrated state, to produce customizable and uniquely engineered flours that functionally enhance the products they are later designed to work with. Additional food elements include, but are not be limited to: other grains, legumes, fruits, vegetables, whey, proteins, such as protein isolates, vitamins, or mineral and nutrients.

A resulting benefit of utilizing high pressure, low temperature, and low water extrusion as a precursor to a finished milled flour is that the expanded and cold water soluble structure increases the availability of nutrients to not only food making chemistries, but also to a consumer's digestive juices and enzymes upon consumption. Further, the flours are characterized by a longer shelf life without the additional use of undesired preservatives or applied heat; due to the low water activity without the use of any additional drying process or water elimination.

Overall, functionally enhanced flours according to the invention bestow one or more of the following advantages on food products incorporating that flour: lower water content; greater product stability and shelf life expectancy; improved cold water absorption and solubility; less nutrient loss to fiber creation; reduced microbial and fungal growth concerns; reduced allergens, including reduced gluten content, increased water absorbing thickening capacity, increased water absorbing "fluffing" or volume increasing ability, near homogeneous mixtures with various other forms of specialty food ingredients in a stable flour form; unique specialty flour creations; enhanced flavor control and stability; enhanced dispersion of a homogeneous blend of multiple ingredients; and enhanced digestibility for human and animal consumption.

In accordance with one embodiment of the invention, the functionally enhanced flour may be formed initially through the extrusion of a starch-containing material, preferably starch-containing admixture, using a method of making functionally enhanced flour in accordance with the present invention producing extruded grain precursor containing about 10% to about 15% water content, by pellet weight.

As discussed in more detail below, flour made in accordance with the present invention exhibits a water content in the functionally enhanced flour grain precursor of about 10% to 15% that is subject to extrusion at an extrusion pressure of greater than about 1000 psi absent the addition of thermal input beyond heat generated form a changing pressure of extrudate. The final water content in the functionally enhanced flour of about 4% to 10% after extrusion of the grain precursor is attained absent the addition of a post-extrusion water introduction or a post-extrusion water reducing manufacturing step.

The starch-containing material preferably is a starch-containing admixture composed of one or more cereal grains, such as one or more of corn, wheat, and/or sorghum, which can be in whole grain form, milled, de-hulled or de-corticated form, de-germed form, and/or comminuted or ground, or a mixture thereof. In another embodiment of the present invention, the functionally enhanced flour is a is a starch-containing admixture composed of one or more cereal grains, such as one or more of corn, wheat and/or sorghum and an additional cereal grain, legume, namely, sweet purple potato, Okinawa sweet potato, *Dioscorea alata* or purple yam, fruit, vegetable, whey, proteins, vitamins, minerals, and/or nutrients.

The starch-containing material preferably is a starch-containing admixture composed of one or more cereal grains, such as one or more of corn, wheat and/or sorghum, which can be in whole grain form, milled, de-hulled or de-corticated form, de-germed form, and/or comminuted or ground, or a mixture thereof. In another embodiment of the present invention, the functionally enhanced flour is a functionally enhanced cereal grain based flour that is made from a starch-containing admixture composed of one or more cereal grains, such as one or more of corn, wheat and/or sorghum, and which can be further composed of an additional cereal grain, legume, namely, sweet purple potato, Okinawa sweet potato, *Dioscorea alata* or purple yam, fruit, vegetable, whey, proteins, vitamins, minerals, and/or nutrients, including micronutrients. A functionally enhanced cereal grain-based flour is a functionally enhanced flour made from a starch-containing admixture composed of at least a majority or at least fifty percent of one or more cereal grains. In one such embodiment, the starch-containing material is a starch-containing admixture composed substantially completely of one or more cereal grains, preferably one or more of corn, wheat, and/or sorghum, with the balance composed of one or more legumes, one or more tubers, e.g., one or more yams, one or more fruits, one or more vegetables, whey, one or more vitamins, one or more minerals, and/or one or more nutrients, such as one or more micronutrients.

In one embodiment of a cereal grain-based functionally enhanced flour, the starch-containing admixture is composed substantially completely, at least ninety percent, preferably at least ninety-five percent, and more preferably at least ninety-eight percent, of one or more cereal grains, such as one or more of corn, wheat and/or sorghum. If desired, the starch-containing admixture can include other or additional cereal grains, including one or more of millet, rice, barley and/or oats. The balance of the admixture not composed of cereal grain can be composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients. In at least one embodiment, the balance of such a starch-containing admixture used to make a cereal grain based functionally enhanced flour in accordance with the present invention is composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In another embodiment of a cereal grain-based functionally enhanced flour, the starch-containing admixture is composed substantially completely, at least ninety percent, preferably at least ninety-five percent, and more preferably at least ninety-eight percent, of a single cereal grain, namely sorghum. If desired, the starch-containing admixture can further include one or more of corn, wheat, millet, rice, barley and/or oats. The balance of the admixture not composed of cereal grain can be composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients. In at least one embodiment, the balance of such a starch-containing admixture used to make a cereal grain based functionally enhanced flour in accordance with the present invention is composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In yet another embodiment of a cereal grain-based functionally enhanced flour, the starch-containing admixture is composed substantially completely, at least ninety percent, preferably at least ninety-five percent, and more preferably at least ninety-eight percent, of wheat. If desired, the starch-containing admixture can further include one or more of corn, sorghum, millet, rice, barley and/or oats. The balance of the admixture not composed of cereal grain can be composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients. In at least one embodiment, the balance of such a starch-containing admixture used to make a cereal grain based functionally enhanced flour in accordance with the present invention is composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In one embodiment of a cereal grain-based functionally enhanced flour, the starch-containing admixture is composed of at least a majority, at least fifty percent, preferably at least seventy-five percent, and more preferably at least eighty percent, of one or more cereal grains, such as one or more of corn, wheat and/or sorghum. If desired, the starch-containing admixture can include other or additional cereal grains, including one or more of millet, rice, barley and/or oats. The balance of the admixture not composed of cereal grain can be composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients. In at least one embodiment, the balance of such a starch-containing admixture used to make a cereal grain based functionally enhanced flour in accordance with the present invention is composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In another embodiment of a cereal grain-based functionally enhanced flour, the starch-containing admixture is composed of at least a majority, at least fifty percent, preferably at least seventy-five percent, and more preferably at least eighty percent, of a single cereal grain, namely sorghum, which can be in the form of whole grain sorghum and/or decorticated sorghum. If desired, the starch-containing admixture can further include one or more of corn, wheat, millet, rice, barley and/or oats. The balance of the admixture not composed of cereal grain can be composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients. In at least one embodiment, the balance of such a starch-containing admixture used to make a cereal grain based functionally enhanced flour in accordance with the present invention is composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In yet another embodiment of a cereal grain-based functionally enhanced flour, the starch-containing admixture is composed of a majority, at least fifty percent, preferably at least seventy-five percent, and more preferably at least eighty percent, of wheat, preferably whole grain wheat. If desired, the starch-containing admixture can further include one or more of corn, sorghum, millet, rice, barley and/or oats. The balance of the admixture not composed of cereal grain can be composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients. In at least one embodiment, the balance of such a starch-containing admixture used to make a cereal grain based functionally enhanced flour in accordance with the present invention is composed of one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In another embodiment of the present invention, the functionally enhanced flour is a functionally enhanced legume-based flour made from a starch-containing admixture composed substantially completely, at least ninety percent, preferably at least ninety-five percent, and more preferably at least ninety-eight percent, of one or more legumes, such as one or more of lentils, chickpeas, peas, lupins, and beans, such as butter beans, haricot (navy) beans, cannellini beans, red kidney beans, adzuki beans, black-eyed beans and soybeans. Where lentils are used in the admixture, the lentils can be red lentils, yellow lentils, brown lentils, or a combination of red lentils, yellow lentils and/or brown lentils. If desired, green lentils, red lentils or black lentils, e.g., beluga lentils, can also be used. If desired, the balance of such a starch-containing admixture can include one or more cereal grains, such as one or more of corn, wheat and/or sorghum, one or more tubers, such as one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients In still another embodiment of the present invention, the functionally enhanced flour is a functionally enhanced legume-based flour made of a starch-containing admixture composed a majority, at least fifty percent, preferably at least seventy-five percent, and more preferably at least eighty-five percent, of one or more legumes, such as one or more of lentils, chickpeas, peas, lupins, and beans, such as butter beans, haricot (navy) beans, cannellini beans, red kidney beans, adzuki beans, black-eyed beans and soybeans. A functionally enhanced legume-based flour is a functionally enhanced flour made from a starch-containing admixture composed of at least a majority or at least fifty percent of one or more legumes. Where lentils are used in the admixture, the lentils can be red lentils, yellow lentils, brown lentils, or a combination of red lentils, yellow lentils and/or brown lentils. If desired, green lentils, red lentils or black lentils, e.g., beluga lentils, can also be used. If desired, the balance of such a starch-containing admixture can include one or more cereal grains, such as one or more of corn, wheat and/or sorghum, one or more tubers, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In one such functionally enhanced legume-based flour embodiment, the starch-containing admixture is composed of at least a majority, at least fifty percent, preferably at least sixty-five percent, and more preferably at least seventy-five percent, of one or more legumes, such as one or more lentils, preferably of red lentils, yellow lentils, brown lentils and/or green lentils, with the balance of the starch-containing admixture composed of at least one additional component, such as one or more cereal grains, e.g., corn, wheat and/or sorghum, one or more tubers, such as one or more yams, e.g., sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In yet another functionally enhanced legume-based flour embodiment, the starch-containing admixture is composed of substantially completely, at least ninety percent, and preferably at least ninety-five percent, of one or more legumes, such as one or more lentils, preferably at least one or more of red lentils, yellow lentils, brown lentils and/or green lentils. The balance of the starch-containing admixture can be and preferably is composed of one or more additional components, such as one or more cereal grains, preferably one or more of corn, wheat and/or sorghum, one or more tubers, e.g., one or more yams, such as one or more of sweet purple potato, Okinawa sweet potato, *Dioscorea alata* or purple yam, one or more fruits, one or more vegetables, whey, one or more proteins, one or more vitamins, one or more minerals, and/or one or more nutrients, such as one or more micronutrients.

In one such preferred functionally enhanced legume-based flour embodiment, the starch-containing admixture is composed entirely, i.e., about ninety-nine percent±one percent, of one or more legumes, preferably of red lentils and/or yellow lentils. If desired, green lentils and/or brown lentils can also be used instead of or in addition to red lentils and/or brown lentils. In another such preferred functionally enhanced legume-based flour embodiment, the starch-containing admixture is composed entirely, i.e., about ninety-nine percent±one percent, of a single legume, preferably of either red lentils or yellow lentils. If desired, the single legume starch-containing admixture can be composed of either green lentils or brown lentils. In yet another such preferred functionally enhanced legume-based flour embodiment, the starch-containing admixture is composed entirely, i.e., about ninety-nine percent±one percent, of one or more lentils, preferably of red lentils and/or yellow lentils. In still another such preferred functionally enhanced legume-based flour embodiment, the starch-containing admixture is composed entirely, i.e., about ninety-nine percent±one percent, of red lentils. In yet another such preferred functionally enhanced legume-based flour embodiment, the starch-containing admixture is composed entirely, i.e., about ninety-nine percent±one percent, of yellow lentils.

In still another embodiment of the present invention, the functionally enhanced flour is made from a starch-containing admixture composed entirely of one or more legumes, such as preferably a starch-containing admixture composed entirely of one or more of red lentils, yellow lentils, brown lentils, or green lentils. In yet another embodiment of the present invention, the functionally enhanced flour is a starch-containing admixture compose entirely of a single legume, such as preferably a starch-containing admixture composed entirely of red lentils, yellow lentils, brown lentils, or green lentils.

The starch-containing material or starch-containing admixture preferably is extruded from a single screw extruder, preferably a 50 horsepower or 100 horsepower single screw extruder, at a residency time or cooking time of no greater than 12 seconds, preferably between 4-11 seconds, and more preferably between 5-10 seconds, at an extruder pressure and/or extruder die pressure of at least 1000 pounds per square inch, and at an extruder temperature of approximately at least 125 degrees Celsius. The main screw of the extruder preferably rotates at a speed of 3000 rpm, with an auger rotating at approximately 35 rpm, with two knife blades. The capacity of the extruder is approximately between 270 pounds per hour and 280 pounds per hour, with batch sizes of approximately 50 pounds. In one preferred method and admixture, the extruder preferably has extruder die pressure of greater than about 2,000 pounds per square inch, greater than about 3,000 pounds per square inch, greater than about 4,000 pounds per square inch, greater than about 5,000 pounds per square inch, and/or greater than about 10,000 pounds per square. In one preferred method and admixture, the extruder preferably has extruder die pressure of greater than about 2,000 pounds per square inch to about 20,000 pounds per square inch. In another preferred method and admixture, the extruder preferably has extruder die pressure of greater than about 5,000 pounds per square inch to about 150,000 pounds per square inch. In one preferred method and admixture, the extruder preferably has extruder die pressure of greater than about 7,500 pounds per square inch to about 12,500 pounds per square inch.

In accordance with one embodiment of the method of manufacturing a functionally enhanced flour product according to the present invention, following extrusion, the resultant extrudates may be subject to milling. While the method of manufacturing of the present invention is not so limited, in one embodiment the extrudates are milled in a roller mill, as to emphasize shredding rather than crushing of the extrudates during the formation of the resultant functionally enhanced flour product. Use of the roller miller may also limit the addition of external energy, such as thermal and/or kinetic energy, into the extrudates, which may have the undesirable effect of denaturing starch molecules in the extrudates. In one embodiment of the invention, the extrudates are milled to a size that is well suited for use of the resultant functionally enhanced flour in the manufacture of a food product, in which the functionally enhanced flour is an ingredient. After milling, the resultant functionally enhanced flour may have an approximate average particle size of between 60 mesh and 100, and more preferably approximately an average of 80 mesh particle size. However, it should be understood the particle size of the functionally enhanced flour is not so limited, and that alternative particle sizes are considered well within the scope of the present invention; and, particularly for use in food products that benefit from such alternative flour particle size.

In one preferred admixture formulation, the starch-containing admixture is composed of at least 80% whole grain de-hulled or de-corticated sorghum, can be composed of as much as 20% sweet purple potato, with the admixture having a moisture content no greater than 15%, preferably no greater than 12%, by admixture weight. In one preferred sorghum-based admixture formulation, the starch-containing admixture is composed substantially completely of whole grain de-hulled or de-corticated sorghum, preferably white sorghum, with the admixture having a moisture content no greater than 15%, preferably no greater than 14%, more preferably no greater than 12% water content, by admixture weight. No additional water or moisture preferably is added to the extruder during extruder operation. In one such preferred sorghum-based admixture formulation, the starch-containing admixture is composed substantially completely of whole grain de-hulled or de-corticated sorghum, preferably white sorghum, with the admixture having a moisture content no greater than 15%, preferably no greater than 13%, more preferably no greater than 11%, by admixture weight with no water added to the admixture prior to or during extruder operation.

In one preferred admixture formulation, the starch-containing admixture is composed of at least 80% whole grain de-hulled or de-corticated sorghum, can be composed of as much as 20% sweet purple potato, with the admixture having a moisture content no greater than 15%, preferably no greater than 12%, by admixture weight. In one preferred sorghum-based admixture formulation, the starch-containing admixture is composed substantially completely of whole grain de-hulled or de-corticated sorghum, preferably white sorghum, with the admixture having a moisture content no greater than 15%, preferably no greater than 14%, more preferably no greater than 12% water content, by admixture weight. No additional water or moisture preferably is added to the extruder during extruder operation. In one such preferred sorghum-based admixture formulation, the starch-containing admixture is composed substantially completely of whole grain de-hulled or de-corticated sorghum, preferably white sorghum, with the admixture having a moisture content no greater than 15%, preferably no greater than 13%, more preferably no greater than 11%, by admixture weight with no water added to the admixture prior to or during extruder operation.

In another preferred admixture formulation, the starch-containing admixture is composed of at least 80% whole grain wheat, can be composed of as much as 20% sweet purple potato, with the admixture having a moisture content no greater than 15%, preferably no greater than 12%, by admixture weight. In one preferred wheat-based admixture formulation, the starch-containing admixture is composed substantially completely of whole grain wheat, with the admixture having a moisture content no greater than 15%, preferably no greater than 14%, more preferably no greater than 12% water content, by admixture weight. No additional water or moisture preferably is added to the extruder during extruder operation. In one such preferred sorghum-based admixture formulation, the starch-containing admixture is composed substantially completely of whole grain wheat, with the admixture having a moisture content no greater than 15%, preferably no greater than 13%, more preferably no greater than 11%, by admixture weight with no water added to the admixture prior to or during extruder operation.

In still another preferred admixture formulation, the starch-containing admixture is composed of at least 80% legumes, preferably red lentils and/or yellow lentils, can be composed of as much as 20% sweet purple potato, with the admixture having a moisture content no greater than 15%, preferably no greater than 12%, by admixture weight. In one preferred legume-based admixture formulation, the starch-containing admixture is composed substantially completely of whole grain legumes, preferably red lentils and/or yellow lentils, with the admixture having a moisture content no greater than 15%, preferably no greater than 14%, more preferably no greater than 12% water content, by admixture weight. No additional water or moisture preferably is added to the extruder during extruder operation. In one such preferred legume-based admixture formulation, the starch-containing admixture is composed substantially completely of whole lentils, preferably yellow lentils and/or red lentils, with the admixture having a moisture content no greater than 15%, preferably no greater than 13%, more preferably no greater than 11%, by admixture weight with no water added to the admixture prior to or during extruder operation.

The extrusion formed functionally enhanced flour preferably provides fluid absorption when the flour is utilized as an ingredient in the formation of a food product. Preferably fluid absorption includes, but is not limited to, increased water absorption, increased oil absorption, and/or increased cold water absorption as compared to a comparable non-extrusion formed flour. A method of manufacturing a food product including the functionally enhanced flour is further provided, as to modify one or more qualities of the food product, including: increasing water absorption, increasing oil absorption, increased cold water absorption; improving flavor stability in the food product; improving nutrient availability in the food product; inhibiting microbial activity in the food product; inhibiting fungal activity in the food product, and/or, improving nutrient and/or protein digestibility in the food product as compared to a comparable food product formed of non-extrusion formed functionally enhanced flour. In one embodiment of the method of manufacturing a food product including the functionally enhanced flour and at least one non-flour food ingredient is combined with the extrusion formed functionally enhanced flour as the present invention, and the resultant food product is characterized by enhanced digestibility of nutrients and protein.

The extrusion formed functionally enhanced flour preferably provides a cold-water solubility when the flour is utilized as an ingredient in the formation a food product. The flour may include a cold-water soluble binder that is water soluble at temperatures below the gelatinization temperature of the type of starch in the admixture from which the binder is formed during extrusion. In a preferred method and embodiment, the water-soluble binder formed in the functionally enhanced flour from starch in the admixture during extrusion preferably is a cold-water soluble binder that is water soluble at temperatures below 60 degrees Celsius or 140 degrees Fahrenheit. In one preferred method and embodiment, the water-soluble binder formed in the functionally enhanced flour from sorghum starch in a sorghum-containing admixture during extrusion preferably is a cold-water soluble binder that is water soluble at temperatures below the gelatinization temperature of sorghum starch and preferably is water soluble at temperatures below 60 degrees Celsius or 140 degrees Fahrenheit.

The present invention can employ the extruding methods and/or equipment, use the starch-containing admixture formulations, and/or process resultant extrudates in accordance with those disclosed or otherwise described in commonly owned U.S. application Ser. Nos. 13/842,534, 13/868,073, 13/868,084, 14/426,483, 14/605,045, 14/656,086, 14/656, 692, 14/668,975, and 15/445,977, respectively published as U.S. Patent Application Publication Nos. US20140069344, US20140069345, US20140069346, US20150238931, US20150145164, US20150181832, US20150181834, and US20150196005, which are hereby expressly incorporated herein by reference.

In addition, it is also contemplated that the present methods can be incorporated into and/or used with the extrusion methods, systems, production lines, equipment and/or extruders disclosed in one or more of U.S. application Ser. Nos. 13/842,534, 13/868,073, 13/868,084, 14/426,483, 14/605,045, 14/656,086, 14/656,692, 14/668,975, and 15/445,977, respectively published as U.S. Patent Application Publication Nos. US20140069344, US20140069345, US20140069346, US20150238931, US20150145164, US20150181832, US20150181834, US20150196005, and US20170188540 in accordance with the present invention including with respect to implementation and/or carrying out the present invention, including one or more of the pre- or post-extrusion processing devices, machines and/or mills.

III. Extruded Flour Manufacturing

In accordance with a preferred example and method of making an extruded flour of the present invention, the inventors carried out four manufacturing trials using the below described weight percentages of ground sorghum and sweet purple potato as grain precursors to yield flours according to the invention after extrusion processing through an Advantage 50, 50 horsepower single screw extruder configured with: a screw and stator of 9-inch L.D. shallow lead style, single flow plate L.D., Die 154 hole, 0.05" hole diameter. Extruder operating parameters for each trial are provided in their respective columns of Table 1 below, where the die pressure and capacity of the extruder varied, as indicated, while the extruder's main screw speed, auger sped, knife blade number and batch size remained constant amongst all four trials.

TABLE 1

| Extruded Flour Manufacturing Trials | | | |
| --- | --- | --- | --- |
| Ingredient | Trial 1 wt % | Trial 2 wt % | Trial 3 wt % | Trial 4 wt % |
| Ground Sorghum | 80 | 60 | 90 | 100 |
| Sweet Purple Potato | 20 | 40 | 10 | 0 |
| Additional Water | 0 | 0 | 0 | 0 |

| Extrusion Parameters | | | |
| --- | --- | --- | --- |
| Main screw. 300 rpm Auger. 35 rpm Knife 2 blades. N/A Batch size. 50 Lbs. Die pressure: 4200 psi Capacity: 280 lb/hr | Main screw. 300 rpm Auger. 35 rpm Knife 2 blades. N/A Batch size. 50 Lbs. Die pressure: 3900-4000 psi Capacity: 275 lb/hr | Main screw. 300 rpm Auger. 35 rpm Knife 2 blades. N/A Batch size. 50 Lbs. Die pressure: 4000-4100 psi Capacity: 270 lb/hr | Main screw. 300 rpm Auger. 35 rpm Knife 2 blades. N/A Batch size. 50 Lbs. Die pressure: 4400 psi Capacity: 280 lb/hr |

As disclosed in PCT Application Publication No. WO2019018543A1, the entirety of which is hereby expressly incorporated herein, the resultant ultra-high pressure extruded sorghum-based flour resulted in higher glucose readings, greater glucose uptake, and increased protein digestibility in test subjects as compared to a control flour that was a conventional flour having the same ingredients as the extruded flour but manufactured according to a conventional non-extruded method. The higher glucose readings, greater glucose uptake, and increased protein digestibility provided by the ultra-high pressure extruded sorghum-based flour resulted from physical modification of starches in the sorghum during ultra-high pressure extrusion of the sorghum into the ultra-high pressure extruded sorghum-based flour thereby making it easier for the test subjects to digest the glucose increasing the rate of glucose uptake and glucose blood plasma levels. In addition, ultra-high pressure extrusion also caused physical modification of proteins in the sorghum during ultra-high pressure extrusion from the single screw extruder by breaking down the tough inner protein walls surrounding the protein bodies in the sorghum enabling the protein bodies to be digested during human consumption thereby increasing protein availability and protein digestibility of the ultra-high pressure extruded sorghum-based flour compared to conventional flour. In addition, the physical modification of the sorghum from ultra-high pressure extrusion also advantageously increased rates of nutrient absorption, particularly of L-Glutamic Acid and L-Proline, compared to conventional flour.

The increase in blood uptake of glucose may be beneficial by more rapidly replenishing glycogen levels for individuals that have diminished glycogen levels due to prolonged physical activity, such as exercise. That is to say that the high-pressure extruded sorghum-based flour, manufactured according to the invention as identified in Table 1 and described above, may be utilized as a nutritional supplement for use in increasing blood glucose levels and resultant glycogen levels in an individual after exercise. Furthermore, such a high-pressure extruded sorghum-based flour of the present invention may also provide additional benefits such as by increasing the amount of digestible protein and/or increasing the digestibility of the protein found in the sorghum due to physical modification of the sorghum during ultra-high pressure extrusion.

III. Functionally Enhanced Flour and Food Product

In a preferred method of making a functional flour that is a functionally enhanced flour of the present invention, an admixture composed substantially completely of starch-containing grain, seed or fruit, preferably grain, seed or fruit of a cereal grain or grain legume, having a starch content of at least 35% by admixture weight, preferably at least 40% by admixture weight, and a moisture content of no greater than 25% by admixture weight, preferably between about 7% and about 18% by admixture weight, is introduced into a single screw extruder and extruded for a residency time within the extruder of no more than 15 seconds, preferably no more than 10 seconds, at an ultra-high internal extrusion pressure at a perforate extrudate exit die of the extruder of at least 2000 psi, preferably at least 4000 psi, and more preferably at least 5000 psi, without the addition of any water or moisture during extrusion, discharging extrudate from the extruder die having a moisture content of no more than 10%, preferably between 4% and 10% by extrudate weight, which is usable in its as-extruded form as functional flour, preferably is an instantized flour or instant flour. If desired, the extruded functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen.

In one preferred implementation of such a method of extruding functional flour, the residency time of the starch-containing grain, seed or fruit admixture within the single screw extruder operating at an ultra-high extrusion pressure is varied to change a flavor profile of the functional flour extruded with residency time increased to make more bland or reduce bitterness of the functional flour extruded from the extruder. In one such preferred method implementation, the residency time of the admixture within the single screw extruder is varied between about 4 seconds and about 15 seconds, preferably between 5 seconds and about 12 seconds, with the extruded functional flour having increased bitterness when residency time is shorter, such as between 4 seconds and 7 seconds, e.g., less than about 7 seconds residency time, and decreased bitterness when residency time is longer, such as between 8 seconds and 15 seconds, e.g., greater than about 8 seconds residency time.

The extruded instantized functional flour of the present invention is in a pregelatinized form when extruded from the extruder, does not retrograde, has a relatively low water activity, $a_w$, of less than 0.5, preferably less than 0.3, and which thereby has a relatively long shelf life when packaged in conventional flour packaging and stored at room temperature of at least 1 year, preferably at least 2 years, and more preferably at least 5 years.

A preferred functional flour embodiment and functional flour making process of the present invention is based on the discovery that extrusion of an admixture substantially completely composed of whole grains, preferably whole grains of one or more cereal grains, having a moisture content of no greater than 25% using a single screw extruder operating at an extrusion temperature of at least 135° Celsius and at an ultrahigh extrusion pressure of at least 2000 PSI for a residency time within the single screw extruder no greater than 10 seconds, preferably no greater than about 7 seconds, and extrusion produces granular extrudate, e.g., extruded granules, suitable for use as a functional flour in its as-extruded state or condition. Such a functional flour embodiment and functional flour making process of the present invention produces extruded functional flour from such whole grains of one or more cereal grains without the whole grains of the admixture having been previously subjected to any prior grinding or milling steps typically required of conventional functional flours and functional flour making processes. If desired, the extruded functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen In one such preferred functional flour embodiment and functional flour making process of the present invention, an admixture composed substantially of whole grains of one or more cereal grains having a moisture content no greater than about 20% is extruded using a single screw extruder at an extrusion temperature of at least 125° Celsius and at an ultrahigh extrusion pressure of at least 2000 PSI without any steam or moisture added to the admixture in the extruder during extrusion for a residency time within the extruder of no more than about 7 seconds before exiting the extruder producing granular extrudate composed of at least 10%, preferably at least 15%, and more preferably at least 50% cold water soluble starch by granular extrudate weight formed during extrusion usable as functional grits or functional flour preferably without any post-extrusion grinding or milling performed thereon after extrusion. In a preferred embodiment, the functional flour produced from the extrudate is substantially completely composed of cold water soluble starch that more preferably is cold water soluble amylopectin starch producing an instantized functional flour of the present invention. If desired, the extruded functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen.

In another such preferred functional flour embodiment and functional flour making process of the present invention, an admixture composed substantially of whole grains of one or more cereal grains having a moisture content no greater than about 20% is extruded using a single screw extruder at an extrusion temperature of at least 125° Celsius and at an ultrahigh extrusion pressure of at least 2000 PSI without any steam or moisture added to the admixture in the extruder during extrusion for a residency time within the extruder of no more than about 7 seconds before exiting the extruder producing an instantized granular extrudate, e.g., instantized extruded granules, composed of at least 10% and preferably at least 15%, more preferably at least 50% cold water soluble starch by granular extrudate weight formed during extrusion usable as instantized functional grits or instantized functional flour. In a preferred embodiment, the functional flour produced from the extrudate is substantially completely composed of cold water soluble starch that more preferably is cold water soluble amylopectin starch producing an instantized functional flour of the present invention. If desired, the extruded functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen.

In one such preferred functional flour embodiment and functional flour making process of the present invention, an admixture composed substantially of whole grains of one or more cereal grains having a moisture content no greater than about 20% is extruded using a single screw extruder at an extrusion temperature of at least 125° Celsius and at an ultrahigh extrusion pressure of at least 2000 PSI without any steam or moisture added to the admixture in the extruder during extrusion for a residency time within the extruder of no more than about 7 seconds before exiting the extruder producing granular extrudate, preferably in the form of grit-sized extruded functional flour granules, composed of cold water soluble starch formed during extrusion usable as functional grits or functional flour without any post-extrusion grinding or milling performed on the extrudate. If desired, the extruded grit-sized functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen.

Such an instantized extruded functional flour or instant extruded functional flour of the present invention is usable without performing any additional processing therewith or thereon and without requiring any additional ingredients, constituents, or substances needing to be mixed or blended therewith by simply only adding water for use. In use, water is added to the extruded functional flour in an amount sufficient for mixing the water with the flour to produce at least a paste and which can produce a dough, e.g., doughy mass, depending on the amount of water mixed with the flour, e.g., dependent on the ratio of water to flour. Mixing instantized extruded functional flour or instant extruded functional flour of the present invention with water at a ratio of 2 parts water to 1 part extruded functional flour produces a paste having a viscosity of at least about 4000 centipoise and no more than about 100,000 centipoise, preferably between 5000 and 50,000 centipoise. The resultant flour paste is a three-dimensionally formable flour paste that can be shaped or formed into a three-dimensionally contoured product, such as preferably formed into a chip, cracker, roll or cookie, while moist in paste form, which retains its three dimensionally contoured product shape while moist, before heating the three dimensionally contoured product to cook or bake it into a substantially hard and/or solid three dimensionally shaped edible food product, e.g. substantially hard and/or solid edible chip, cracker, roll or cookie. In a preferred method of making an edible food product, the flour paste is formed to have a desired three dimensional shape, e.g., formed into a three dimensional product, such as having the shape of a chip, cracker, roll or cookie, while a moist flour paste before being baked, such as in an oven, e.g., baking oven, at a temperature of at least 325 degrees Fahrenheit, preferably at least 400 degrees Fahrenheit, for at least five minutes, preferably at least ten minutes, more preferably for at least twenty minutes, until substantially hard, e.g., substantially uniformly cooked or baked throughout, forming a human edible food product, such as a chip, cracker, roll, or cookie, which preferably is crispy or crunchy.

Mixing instantized extruded functional flour or instant extruded functional flour of the present invention with water at a ratio of 1 part water to 1 part extruded functional flour produces a three-dimensionally formable dough having a viscosity of at least about 250,000 centipoise and no more than about 1,500,000 centipoise, preferably between 750,000 centipoise and 1,250,000 centipoise, and more preferably about 1,000,000 centipoise. The resultant flour dour is a three-dimensionally formable flour dough that can be shaped or formed into a three-dimensionally contoured product, such as preferably formed into a chip, cracker, roll or cookie, while moist in dough form, which retains its three dimensionally contoured product shape while moist, before heating the three dimensionally contoured product to cook or bake it into a substantially hard and/or solid three dimensionally shaped edible food product, e.g. substantially hard and/or solid edible chip, cracker, roll or cookie. In a preferred method of making an edible food product, the flour dough is formed to have a desired three dimensional shape, e.g., formed into a three dimensional product, such as having the shape of a chip, cracker, roll or cookie, while a moist flour dough before being baked, such as in an oven, e.g., baking oven, at a temperature of at least 325 degrees Fahrenheit, preferably at least 400 degrees Fahrenheit, for at least five minutes, preferably at least ten minutes, more preferably for at least twenty minutes, until substantially hard, e.g., substantially uniformly cooked or baked throughout, forming a human edible food product, such as a chip, cracker, roll, or cookie, which preferably is crispy or crunchy.

IV. Functionally Enhanced Wheat Flour and Food Product

The present invention also encompasses a functionally enhanced wheat food product made using an above-discussed method of extrusion in accordance with the present invention that preferably is a flour having a suitable mesh size, such as flour with particle sizes no larger than about 100 mesh. The present invention further encompasses a functional enhanced wheat food product made using an above-discussed method of extrusion in accordance with the present invention that preferably is packaged or used as a food product or ingredient of a food product in an as-extruded grit form.

A functionally enhanced flour or grits made in accordance with the present invention is at least wheat-based functionally enhanced flour or grits extruded from a wheat admixture that preferably is composed of whole wheat or whole grain wheat with the admixture preferably composed of at least fifty percent wheat by dry admixture weight. In a preferred embodiment, functionally enhanced flour or grits made in accordance with the present invention is extruded from a wheat admixture that preferably is composed substantially completely of whole wheat or whole grain wheat with such an admixture preferably composed of at least ninety percent wheat by dry admixture weight.

Such functionally enhanced flour or grits is composed of starch formed during or by extrusion that is cold water soluble such that functionally enhanced flour or grits relatively easily and rapidly dissolves or goes into solution when wetted with room temperature water. When wetted with water, the water is absorbed by the flour causing it to swell up to a greater volume than a conventional wheat flour. In fact, functionally enhanced wheat-based flour made by extrusion in accordance with the present invention absorbs a greater amount of water than conventional wheat flour by absorbing at least four times, preferably at least five times, and more preferably at least about six times the weight of the wheat-based functionally enhanced flour in water when wetted with water, e.g., cold water or room temperature water. In addition, functionally enhanced wheat-based grits made by extrusion in accordance with the present invention also absorbs at least three times, preferably at least four times, and more preferably at least five times its weight in water when wetted with water, e.g., cold water or room temperature water.

The wheat-based functionally enhanced flour made by extrusion in accordance with the present invention also has a peak viscosity less than that of conventional wheat flour with a preferred wheat-based functionally enhanced flour having a peak viscosity that is at least one-half and preferably at least about one-third the peak viscosity of conventional wheat flour. The wheat-based functionally enhanced flour also decreases in viscosity as it cools down becoming more viscous or thicker over time as its temperature cools. When a suitable amount of water is added, such as an amount about equal to or greater than, e.g., excess water, the maximum amount of water the functionally enhanced wheat-based flour is capable of absorbing, the functionally enhanced wheat-based flour can form a relatively flowable slurry advantageously having the consistency or thickness of a gravy, porridge, or pudding.

Such functionally enhanced wheat-based flour or grits also advantageously relatively rapidly absorbs water because of the relatively large amount of cold water soluble starch formed in the flour during ultrahigh pressure extrusion. A preferred functionally enhanced wheat-based flour or grits, preferably a functionally enhanced wheat flour or grits extruded from an admixture composed substantially completely of wheat, e.g., whole wheat or whole grain wheat, relatively rapidly absorbs at least four times its dry weight in water in no more than two and a half minutes, absorbs at least five times its dry weight in water in no more than two and a half minutes, and preferably absorbs about six times its dry weight in water in no more than two and a half minutes. One such preferred functionally enhanced wheat-based flour or grits is a functionally enhanced wheat flour or grits extruded under an ultrahigh extrusion pressure from an admixture composed substantially completely of wheat, e.g., whole wheat or whole grain wheat, advantageously absorbs at least four times its dry weight in water in no more than two minutes, absorbs at least five times its dry weight in water in no more than two minutes, and preferably absorbs about six times its dry weight in water in no more than two minutes.

When completely wetted with water, wheat-based functionally enhanced flour of the present invention becomes flowable and preferably is liquified but is relatively thick. When completely wetted with water, wheat-based functionally enhanced grits of the present invention can become flowable and may become liquified but remains relatively thick if it does become liquified and/or flowable.

When functionally enhanced wheat flour is wetted with cold water, e.g., room temperature water, the relatively small particles of the flour will coalesce into an agglomerated liquified mass that can and preferably does become flowable. When functionally enhanced wheat grits are wetted with cold water, e.g., room temperature water, the relatively small particles of the grits also will coalesce into an agglomerated liquified mass but which typically does not become flowable or as flowable as the flour does. If allowed to dry, the agglomerated mass will form a clump that can become relatively hard. Functionally enhanced wheat-based flour or grits advantageously is formable when it is wetted with water and pastes because the individual or discrete wheat flour or grit particles will absorb water and coalesce into a mass that is formable. When in such a paste form and formable, the wetted functionally enhanced wheat-based flour or grits can be three-dimensionally shaped or formed into a desired shape. When in such a paste form and formable, the wetted functionally enhanced wheat-based flour or grits can be three-dimensionally shaped or formed to more readily conform to the three-dimensional contour or shape of a pan, bowl or mold, e.g., cake mold.

Such functionally enhanced wheat-based flour or grits, which can be functionally enhanced wheat flour or grits, is advantageous because it possesses modified enzymatic activity compared to whole wheat, e.g. whole-grain wheat, and conventional wheat flour and conventional grits because at least some enzymes naturally present in wheat are modified during extrusion, preferably ultrahigh pressure extrusion, resulting in less of those enzymes being present after extrusion. In one preferred embodiment of a functionally enhanced wheat-based flour or grits, preferably functionally enhanced wheat flour or grits, the functionally enhanced flour or grits advantageously has reduced enzymatic activity compared to wheat and conventional wheat flour because at least some of the enzymes present in the wheat in the extrusion admixture are modified by being deactivated during ultrahigh pressure extrusion in making functionally enhanced flour or grits reducing the amount of the enzymes present after extrusion.

A food product made with functionally enhanced cereal grain-based flour made in accordance with the present invention has an altered, preferably improved flavor profile, as a result of the functionally enhanced cereal-grain based flour having lesser amount of and/or reduced activity from plant-based phenols, flavonoids, isoflavones, terpenes, and glucosinolates, which improve taste and/or flavor because these are almost always bitter, acrid or astringent. Such a food product made with functionally enhanced cereal grain-based flour made in accordance with the present invention preferably also possesses reduced enzymatic activity in the functionally enhanced cereal grain-based flour as compared to the same food product made with conventional cereal grain flour and conventional cereal grain functional flour. Such reduced enzymatic activity is caused by a reduction in enzymes in the functionally enhanced cereal-grain based flour as compared to conventional cereal grain flour and conventional cereal grain functional flour.

In at least one preferred functionally enhanced wheat-based flour or grits, such as a functionally enhanced wheat flour or grits, the functionally enhanced flour or grits possesses at least 15% less enzymes, preferably at least 25% less enzymes, and more preferably at least 40% less enzymes than the wheat from which the functionally enhanced flour or grits was extruded. In one such preferred functionally enhanced wheat-based flour or grits that can be a functionally enhanced wheat flour or grits, the functionally enhanced flour or grits possesses at least 15% less endogenous enzymes, preferably at least 25% less endogenous enzymes, and more preferably at least 40% less endogenous enzymes than conventional wheat flour or conventional wheat grits due to the use of ultrahigh pressure extrusion in making the functionally enhanced flour or grits. In such a preferred functionally enhanced wheat-based flour or grits that can be a functionally enhanced wheat flour or grits, the functionally enhanced flour or grits possesses at least 15% less of one or more of amylase, e.g., alpha-amylase and/or beta-amylase, proteolytic enzymes, e.g., proteinase and/or protease, xylanase, peroxidase, peptidase, and/or endoxylanase, preferably at least 25% less of one or more of amylase, e.g., alpha-amylase and/or beta-amylase, proteolytic enzymes, e.g., proteinase and/or protease, xylanase, peroxidase, peptidase, and/or endoxylanase, and more preferably at least 40% less of one or more of amylase, e.g., alpha-amylase and/or beta-amylase, proteolytic enzymes, e.g., proteinase and/or protease, xylanase, peroxidase, peptidase, and/or endoxylanase than conventional wheat flour and conventional wheat grits due to the use of ultrahigh pressure extrusion in making the functionally enhanced flour or grits. In another such preferred functionally enhanced wheat-based flour or grits that is a functionally enhanced wheat flour or grits, the functionally enhanced flour or grits possesses at least 15% less endogenous enzymes, preferably at least 25% less endogenous enzymes, and more preferably at least 40% less endogenous enzymes than conventional wheat flour and conventional wheat grits. In such a preferred functionally enhanced wheat-based flour or grits that is a functionally enhanced wheat flour or grits, the functionally enhanced flour or grits possesses at least 15% less of endogenous enzymes composed of the group of amylase, proteolytic enzymes, and at least one of peptidase and endoxylanase, preferably at least 25% less of endogenous enzymes composed of the group of amylase, proteolytic enzymes, and at least one of peptidase and endoxylanase, and more preferably at least 40% less of endogenous enzymes composed of the group of amylase, proteolytic enzymes, and at least one of peptidase and endoxylanase, than conventional wheat flour or grits or the wheat from which the functionally enhanced flour or grits was extruded using ultrahigh pressure extrusion.

Such modification and preferably reduction in enzymatic activity in functionally enhanced wheat-based and wheat flour or grits of the present invention also advantageously modifies a flavor profile or flavor profiles of the resultant functionally enhanced flour or grits and food product made with the resultant functionally enhanced flour or grits. In a preferred embodiment, reduction of enzymatic activity in the functionally enhanced wheat-based or wheat flour or grits produced by the reduction in enzymes endogenous to the wheat being extruded to make the functionally enhanced flour or grits produces an improved flavor profile or taste, such as by reducing sweetness and/or introducing a nutty flavor to the functionally enhanced flour or grits.

In at least one preferred embodiment of functionally enhanced wheat-based or wheat flour or grits of the present invention, the functionally enhanced wheat-based or wheat flour or grits contains at least one enzyme not endogenous to wheat that is formed during extrusion of wheat in carrying out an above-described method of making functionally enhanced flour or grits of the invention. In a preferred embodiment, at least one enzyme not endogenous to wheat is formed during ultrahigh pressure extrusion of wheat in making functionally enhanced wheat-based or wheat flour or grits and imparts at least beneficial property or characteristic to the functionally enhanced flour or grits. In one such preferred embodiment, at least one enzyme not endogenous to wheat formed of or from protein in the wheat extruded using ultrahigh pressure extrusion imparts to the resultant functionally enhanced wheat-based or wheat flour or grits an improved flavor profile or taste, such as by making the functionally enhanced flour less sweet or imparting a nutty flavor to the flour or grits.

Functionally enhanced wheat-based or wheat flour or grits also advantageously possesses a reduced allergen level compared to conventional wheat flour and conventional wheat grits. A preferred reduced-allergan functionally enhanced wheat-based or wheat flour or grits contains at least 40% less, preferably at least 70% less, and more preferably at least about 84% less of at least one allergen normally present in the wheat from which the functionally enhanced flour or grits was extruded. One such preferred reduced-allergen functionally enhanced wheat-based or wheat flour or grits contains at least 30% less, preferably at least 50% less, and more preferably at least about 65% less of at least one allergen as compared to a conventional wheat flour or conventional wheat grits.

A functionally enhanced wheat-based or wheat flour or grits made in carrying out a method of making functionally enhanced flour or grits using extrusion in accordance with the present invention is a reduced gluten functionally enhanced wheat-based or wheat flour or grits containing less gluten than the wheat from which the functionally enhanced flour or grits was extruded. Such a reduced gluten functionally enhanced wheat-based or wheat flour or grits made in carrying out a method of making functionally enhanced flour or grits using ultra high pressure extrusion in accordance with the present invention contains less gluten than the wheat from which the functionally enhanced flour or grits was extruded and also advantageously contains less gluten than conventional wheat flour and conventional wheat grits. A preferred reduced gluten functionally enhanced wheat-based or wheat flour or grits contains at least 40% less, preferably at least 70% less, and more preferably at least about 84% less gluten than the wheat from which the functionally enhanced flour or grits was extruded. In one preferred embodiment, reduced gluten functionally enhanced wheat-based flour or grits preferably is a reduced gluten functionally enhanced wheat flour or grits that is made by extruding wheat under ultrahigh extrusion pressures producing a reduced gluten functionally enhanced wheat flour or grits that contains no more than 15,000 parts per million (ppm) of gluten, and preferably contains no more than about 12,000 ppm gluten, which is significantly less than whole wheat or whole grain wheat which typically contains about 75,000 ppm gluten. One preferred reduced allergen functionally enhanced wheat-based or wheat flour or grits contains at least 30% less, preferably at least 50% less, and more preferably at least about 65% less of at least one allergen as compared to conventional wheat flour and conventional wheat grits. One such preferred reduced gluten functionally enhanced wheat-based or wheat flour or grits contains at least 30% less, preferably at least 50% less, and more preferably at least about 65% less of gluten as compared to conventional wheat flour and conventional wheat grits.

A food product made with functionally enhanced wheat-based flour has significantly reduced allergens, preferably reduced gluten, as compared to the same food product made with conventional wheat flour. Such a functionally enhanced wheat-based flour contains at least fifty percent less, preferably at least seventy-five percent less, and more preferably at least about eighty four percent less gluten than the wheat from which the functionally enhanced wheat-based flour was made. Such a functionally enhanced wheat-based flour also advantageously contains at least forty percent less, preferably at least fifty percent less and more preferably at least sixty percent less gluten than a conventional wheat flour.

V. Functionally Enhanced Legume Flour and Food Product

Another preferred functional enhanced food product, e.g., flour or grits, of the present invention is functionally enhanced legume-based flour or grits composed of at least fifty percent legumes in the starch-containing admixture, by dry admixture weight, from which the flour or grits is extruded preferably under an ultrahigh extrusion pressure. In one preferred embodiment, the functionally enhanced legume-based flour or grits of the present invention is functionally enhanced lentil-based flour or grits extruded from an admixture composed of at least fifty percent by dry admixture weight of one or more lentils, such as red lentils, yellow lentils and/or another type of lentils. If desired, the flour or grits can be composed substantially completely of legumes in that the admixture from which the flour or grits was extruded is composed substantially completely of one or more legumes.

Functionally enhanced flour or grits of the present invention is made by extrusion in a single screw extruder that causes pre-gelatinization and simplified post-gelatinization characteristics of whole grain and whole legume seed contents with expanded material content access while minimizing reactive and restrictive processing elements, which is all accomplished within an operational period or extruder residency time that is measured in seconds. In a preferred method of making functionally enhanced flour or grits of the present invention using ultrahigh pressure extrusion, the cereal grain and/or legume admixture passes through the single extruder in no more than 10 seconds and preferably no more than about 5-7 seconds such that extruder residency time is no more than 10 seconds and preferably no more than about 5-7 seconds.

Preferably, ultrahigh extrusion pressure of at least 2000 psi is utilized to gelatinize an admixture comprised of cereal grain and/or legume(s), e.g. cereal grain seed and/or legume seed, contents without the direct addition of other materials, heat, or water to the admixture. While utilizing the natural water content already contained within the cereal grain and/or legume(s), pressure is the matrix factor that is maximized, with absolute minimization of all other factorial influences that previous manufacturing methods have focused on in excessive amounts, such as water and heat. Those excessive amounts require additional equipment and energy just to bring the processed material, e.g., conventional flour or grits, back into a more desirable and usable state, while at the same time causing a loss of some functionally desirable properties of the material in the process.

As the screw progresses during extrusion of the functionally enhanced flour or grits, the cereal grain and/or legume(s) admixture comes under increasing pressure, which can and preferably does cause some mechanical cutting or mechanical grinding of the admixture, the solid state phase of the cereal grain and/or legume admixture shifts and the admixture begins to gelatinize (enters a more molecularly mobile, heavy liquid phase) within the single screw extruder. Mixing of the contents of the admixture by the screw of the extruder while in such a molecularly mobile gelatinous, e.g., gelatinized, state helps to homogenize the gelatinized material within the extruder to an extent, which in turn also causes protein in the gelatinized material from the cereal grain and/or legumes in the admixture to lose their tertiary and quaternary structures. Such tertiary and quaternary structures of these proteins of the cereal grain and/or legumes of the admixture and gelatinized material formed within the extruder during extrusion are the weakly bonded fold arrangements that allow the proteins to carry out specific functions. Thus, proteins of the cereal grains and/or legumes of the admixture and/or gelatinized material within the extruder are denatured while in the extruder under ultrahigh extrusion pressures, modifying those proteins into a form, e.g., folded shape or physical arrangement, which makes the ultrahigh pressure extrusion modified proteins unable to carry out their original functions, leading to enzyme deactivation and flavor neutrality, while also increasing protein digestibility.

Upon exiting the die of the extruder, the transition from ultrahigh extrusion pressure to atmospheric pressure allows water within the gelatinized material exiting the die to shift from a liquid state into a vapor state, resulting in vaporized steam pressure arising in the molecularly mobile gelatinous state of the gelatinized material exiting the extruder and expanding the contents of the gelatinized material. Pressure is released from the gelatinized material exiting the extruder, water is evaporated from the gelatinized material exiting the extruder, the gelatinized material exiting the extruder is expanded, and the gelatinized material exiting the extruder immediately solidifies in the expanded state as it exits the extruder in the form of extrudate. This extrudate can be and typically is further reduced to a desired particle size, such as by cutting, crushing, grinding and/or via another comminution process.

If desired, the extruded functional flour granules of the present invention can be milled after extrusion into smaller sized functional flour particles of the present invention such that at least 90%, preferably at least 98%, of the milled functional flour particles of the present invention should pass through a 212-μm sieve, e.g. a #70 US Standard Mesh screen.

In one preferred functionally-enhanced flour or grits embodiment, the flour or grits is composed substantially completely of one or more legumes in that the admixture from which the flour or grits was extruded is composed substantially completely of one or more legumes. In one such preferred functionally enhanced legume-based flour embodiment, the flour is composed substantially completely of one or more lentils, such as one or more of red lentils, yellow lentils or another type of lentil, in that the admixture from which the flour or grits was extruded is composed substantially completely of one or more lentils.

Such functionally enhanced legume-based flour or grits, which can be functionally enhanced legume flour or grits, is advantageous because it possesses modified enzymatic activity compared to legumes and conventional legume flour and conventional grits because at least some enzymes naturally present in legumes are modified during extrusion, preferably ultrahigh pressure extrusion, resulting in less of those enzymes being present after extrusion. In one preferred embodiment of a functionally enhanced legume-based flour or grits, preferably functionally enhanced legume flour or grits, the functionally enhanced flour or grits advantageously has reduced enzymatic activity compared to legumes and conventional legume flour because at least some of the enzymes present in the legumes in the extrusion admixture are modified by being deactivated during ultra-high pressure extrusion in making functionally enhanced flour or grits having a reduced amount of the enzymes present after extrusion.

In at least one preferred functionally enhanced legume-based flour or grits, such as functionally enhanced legume flour or grits, the functionally enhanced flour or grits possesses at least 15% less enzymes, preferably at least 25% less enzymes, and more preferably at least 40% less enzymes than the legumes from which the functionally enhanced flour or grits was extruded. In one such preferred functionally enhanced legume-based flour or grits that can be a functionally enhanced legume flour or grits, the functionally enhanced flour or grits possesses at least 15% less endogenous enzymes, preferably at least 25% less endogenous enzymes, and more preferably at least 40% less endogenous enzymes than conventional legume flour or conventional legume grits due to the use of ultrahigh pressure extrusion in making the functionally enhanced flour or grits. In such a preferred functionally enhanced legume-based flour or grits that can be a functionally enhanced legume flour or grits, the functionally enhanced flour or grits possesses at least 15% less of one or more of amylase, e.g., alpha-amylase and/or beta-amylase, proteolytic enzymes, e.g., proteinase and/or protease, xylanase, peroxidase, peptidase, and/or endoxylanase, preferably at least 25% less of one or more of amylase, e.g., alpha-amylase and/or beta-amylase, proteolytic enzymes, e.g., proteinase and/or protease, xylanase, peroxidase, peptidase, and/or endoxylanase, and more preferably at least 40% less of one or more of amylase, e.g., alpha-amylase and/or beta-amylase, proteolytic enzymes, e.g., proteinase and/or protease, xylanase, peroxidase, peptidase, and/or endoxylanase than conventional legume flour and conventional legume grits due to the use of ultrahigh pressure extrusion in making the functionally enhanced flour or grits.

In another such preferred functionally enhanced legume-based flour or grits that is functionally enhanced legume flour or grits, the functionally enhanced legume-based flour or grits that is functionally enhanced legume flour or grits is functionally enhanced lentil-based flour or grits that is functionally enhanced lentil flour or grits, the functionally enhanced flour or grits possesses at least 15% less endogenous enzymes, preferably at least 25% less endogenous enzymes, and more preferably at least 40% less endogenous enzymes than conventional lentil flour and conventional lentil grits. In such preferred functionally enhanced lentil-based flour or grits that is a functionally enhanced lentil flour or grits, the functionally enhanced flour or grits possesses at least 15% less of endogenous enzymes composed of the group of amylase, proteolytic enzymes, and at least one of peptidase and endoxylanase, preferably at least 25% less of endogenous enzymes composed of the group of amylase, proteolytic enzymes, and at least one of peptidase and endoxylanase, and more preferably at least 40% less of endogenous enzymes composed of the group of amylase, proteolytic enzymes, and at least one of peptidase and endoxylanase, than conventional lentil flour or grits or the lentils from which the functionally enhanced flour or grits was extruded using ultrahigh pressure extrusion.

Such modification and preferably reduction in enzymatic activity in functionally enhanced legume-based and legume flour or grits of the present invention also advantageously modifies a flavor profile or flavor profiles of the resultant functionally enhanced flour or grits and food product made with the resultant functionally enhanced flour or grits. In a preferred embodiment, reduction of enzymatic activity in the functionally enhanced legume-based or legume flour or grits produced by the reduction in enzymes endogenous to the legumes being extruded to make the functionally enhanced flour or grits produces an improved flavor profile or taste, such as by reducing sweetness and/or introducing a nutty flavor to the functionally enhanced flour or grits.

In at least one preferred embodiment of functionally enhanced legume-based or legume flour or grits of the present invention, the functionally enhanced legume-based or legume flour or grits contains at least one enzyme not endogenous to legumes that is formed during extrusion of legume in carrying out an above-described method of making functionally enhanced flour or grits of the invention. In a preferred embodiment, at least one enzyme not endogenous to legumes, e.g., lentils, is formed during ultrahigh pressure extrusion of legumes in making functionally enhanced legume-based or legume flour or grits, preferably functionally enhanced lentil-based or lentil flour or grits, and imparts at least beneficial property or characteristic to the functionally enhanced flour or grits. In one such preferred embodiment, at least one enzyme not endogenous to legumes, preferably lentils, formed of or from protein in the legumes, preferably lentils, extruded using ultrahigh pressure extrusion imparts to the resultant functionally enhanced legume-based or legume flour or grits, preferably functionally enhanced lentil-based or lentil flour or grits, an improved flavor profile or taste, such as by making the functionally enhanced flour less sweet or imparting a nutty flavor to the flour or grits A food product made with functionally enhanced legume-based flour has increased water absorption capacity as such a functionally enhanced legume-based flour made in accordance with the present invention absorbs up to six times its weight in water. A food product made with functionally enhanced legume-based flour will take up a greater volume using a lesser amount of flour as compared to conventional flour because such a functionally enhanced legume-based flour made in accordance with the present invention occupies at least twice the volume as a conventional legume flour when the same dry amount of each type of flour is wetted with the same amount of water. In a preferred embodiment, a food product, such as a sauce or gravy, made with functionally enhanced legume-based flour will take up a greater volume using a lesser amount of flour than conventional legume flour because such a functionally enhanced legume-based flour made in accordance with the present invention produces at least two and half times the volume, and preferably produces three times the volume that a conventional legume flour does when the same dry amount of conventional legume flour and the functionally enhanced legume-based flour are wetted with water.

A food product made with functionally enhanced legume-based flour has an altered, preferably improved flavor profile, as a result of reduced enzymatic activity in the functionally enhanced legume-based flour as compared to the same food product made with conventional legume flour. Such reduced enzymatic activity is caused by a reduction in enzymes in the functionally enhanced legume-based flour as compared to conventional flour The present invention is directed to a functionally enhanced flour produced by extruding a grain precursor having a water content of about 10% to about 15% at an extrusion pressure greater than about 1000 psi to yield a functionally enhanced flour with a final water content of about 4% to about 10%, wherein: the extruding step is carried out without thermal input beyond heat generated from a changing pressure of extrudate; and the final water content is attained without a post-extrusion water reducing step. Such a functionally enhanced flour is composed of cold-water soluble starch, and preferably is composed of cold-water soluble amylopectin starch. Such a functionally enhanced flour is an instantized flour. A grain precursor from which the functionally enhanced flour is produced is one of a whole grain, milled grain precursor, or mixture thereof. A grain precursor from which the functionally enhanced flour is produced consists of a legume and a cereal grain. A grain precursor from which the functionally enhanced flour is produced consists of a whole grain, milled grain, or mixture thereof. A grain precursor from which the functionally enhanced flour is produced consists of a single grain or a mixture of two or more grains.

The functionally enhanced flour is extruded at an extrusion pressure of at least 2000 psi and carried out using a single screw extruder. Such a functionally enhanced flour is composed substantially completely of cold-water soluble starch, and preferably is composed of cold-water soluble amylopectin starch. Such a functionally enhanced flour can be and preferably is an instantized flour.

A method of producing a functionally enhanced flour includes: extruding a grain precursor having a water content of about 10% to about 15% at an extrusion pressure greater than about 1000 psi to yield a functionally enhanced flour with a final water content of about 4% to about 10%, wherein: the extruding step is carried out without thermal input beyond heat generated from a changing pressure of extrudate; and the final water content is attained without a post-extrusion water reducing step. In one such method, the functionally enhanced flour is substantially completely composed of cold-water soluble starch. In another such method, functionally enhanced flour is an instantized flour.

In such a preferred method of making functionally enhanced flour, the extruding step is carried out with a single screw extruder at an ultrahigh extrusion pressure of at least 2000 psi. In one such method, the functionally enhanced flour is substantially completely composed of cold-water soluble starch. In another such method, functionally enhanced flour is an instantized flour.

Other embodiments and uses of the invention will be apparent to those skilled in the art from consideration from the specification and practice of the invention disclosed herein. All references cited herein for any reason, including all journal citations and U.S./foreign patents and patent applications, are specifically and entirely incorporated herein by reference. It is understood that the invention is not confined to the specific materials, methods, formulations, operating/assay conditions, etc., herein illustrated and described, but embraces such modified forms thereof as come within the scope of the following claims.

What is claimed is:

1. A method of producing a functionally enhanced flour, comprising:
   (a) providing an extruder and an admixture comprised of one of a cereal grain and a legume; and
   (b) extruding the admixture in the extruder at an extrusion pressure of at least 2000 psi to produce extrudate that is a functionally enhanced flour comprised of a cold-water soluble starch, wherein:
   the extruding step is carried out without any thermal input beyond heat generated from a changing pressure of the extrudate; and
   no water or moisture is added during extrusion.

2. The method according to claim 1, wherein the functionally enhanced flour does not retrograde.

3. The method according to claim 2, wherein the functionally enhanced flour has water activity, $a_w$, of less than 0.5 after the extruding step (b) and without drying the functionally enhanced flour.

4. The method according to claim 3, wherein the functionally enhanced flour has water activity, $a_w$, of less than 0.3.

5. The method according to claim 1, wherein the functionally enhanced flour has water activity, $a_w$, of less than 0.5 after the extruding step (b) and without drying the functionally enhanced flour.

6. The method according to claim 5, wherein the functionally enhanced flour has water activity, $a_w$, of less than 0.3.

7. The method according to claim 5, wherein the functionally enhanced flour has a shelf life of at least 1 year when packaged in conventional flour packaging and stored at room temperature.

8. The method according to claim 7, wherein the functionally enhanced flour has a shelf life of at least 2 years when packaged in conventional flour packaging and stored at room temperature.

9. The method according to claim 8, wherein the functionally enhanced flour has a shelf life of at least 5 years when packaged in conventional flour packaging and stored at room temperature.

10. The method according to claim 8, wherein the functionally enhanced flour does not retrograde.

11. The method according to claim 1, wherein the functionally enhanced flour has a shelf life of at least 1 year when packaged in conventional flour packaging and stored at room temperature.

12. The method according to claim 11, wherein the functionally enhanced flour has a shelf life of at least 2 years when packaged in conventional flour packaging and stored at room temperature.

13. The method according to claim 12, wherein the functionally enhanced flour has a shelf life of at least 5 years when packaged in conventional flour packaging and stored at room temperature.

14. The method according to claim 1, wherein the functionally enhanced flour comprises an instantized flour.

15. The method according to claim 14, wherein the functionally enhanced flour does not retrograde.

16. The method according to claim 14, wherein the functionally enhanced flour is in a pregelatinized form.

17. The method according to claim 16, wherein the functionally enhanced flour does not retrograde.

18. The method according to claim 1, wherein during the extruding step, the admixture is extruded in the extruder for a residency time which is controllably varied to impart a desired flavor profile on the functionally enhanced flour produced.

19. The method according to claim 18, wherein the admixture is extruded in the extruder for a residency time of less than 7 seconds for increasing the bitterness of the functionally enhanced flour.

20. The method according to claim 19, wherein the admixture is extruded in the extruder for a residency time of between 4 seconds and 7 seconds.

21. The method according to claim 18, wherein the admixture is extruded in the extruder for a residency time of at least 8 seconds for increasing the sweetness of the functionally enhanced flour.

22. The method according to claim 21, wherein the admixture is extruded in the extruder for a residency time of between 8 seconds and 15 seconds.

23. The method according to claim 1, wherein the extruder is a single screw extruder.

24. The method according to claim 1, wherein the extruder has a die comprised of at least a plurality of holes, each hole having a size of 0.05 inches.

25. The method according to claim 24, wherein each one of the holes in the die of the extruder has a diameter of 0.05 inches.

26. The method according to claim 25, wherein the die of the extruder has 154 holes.

27. The method according to claim 26, wherein the extruder is a single screw extruder.

28. The method according to claim 27, wherein the single screw extruder is a 50 horsepower extruder or a 100 horsepower single screw extruder.

29. The method according to claim 28, wherein the extrusion pressure of the extruder is at least 4000 psi.

30. The method according to claim 1, wherein the cereal grain or the legume is comprised of a grain, seed, or fruit.

31. The method according to claim 1, wherein the admixture is substantially completely comprised of either the cereal grain or the legume.

32. The method according to claim 1, wherein the admixture consists of either the cereal grain or the legume.

33. The method according to claim 1, wherein the cereal grain of the admixture is comprised of at least one of corn, wheat, sorghum, millet, rice, barley and oats.

34. The method according to claim 1, wherein the legume of the admixture is comprised of at least one of a lentil, a chickpea, a pea, a lupin, and a bean.

35. The method according to claim 1, wherein the functionally enhanced flour is usable after extrusion with only the addition of water thereto.

36. The method according to claim 35, comprising the further step of mixing the functional flour with water and forming a three-dimensionally formable paste therefrom.

37. The method according to claim 35, wherein the functionally enhanced flour is usable after extrusion without performing any post-extrusion processing thereon and without any additional ingredients, constituents or substances added thereto.

38. The method according to claim 35, wherein the functionally enhanced flour is usable after extrusion without performing any post-extrusion processing thereon other than particle size reduction and without any additional ingredients, constituents or substances added thereto.

39. The method according to claim 38, wherein the functionally enhanced flour is reduced in particle size in a post-extrusion step.

40. The method according to claim 39, wherein the functionally enhanced flour extruded from the extruder is comprised of functionally enhanced flour granules and comprising the further step of reducing the size of the functionally enhanced flour granules to form smaller sized functionally enhanced flour particles such that at least 90% of the smaller sized functionally enhanced flour particles pass through a #70 US Standard Mesh Screen.

41. The method according to claim 40, wherein during the particle size reduction step, the functionally enhanced flour granules are reduced in size to form smaller sized functionally enhanced flour particles such that at least 99% of the smaller sized functionally enhanced flour particles pass through a #70 US Standard Mesh Screen.

42. The method according to claim 1, wherein after the extruding step (b), further comprising mixing the functionally enhanced flour with water at a ratio of 2 parts water to 1 part extruded functionally enhanced flour and producing a flour paste having a viscosity of at least about 4000 centipoise.

43. The method according to claim 42, wherein the flour paste has a viscosity of no more than about 100,000 centipoise.

44. The method according to claim 42, wherein the flour paste has a viscosity of between 5000 centipoise and 50,000 centipoise.

45. The method according to claim 44, wherein the flour paste is three-dimensionally formable into a three-dimensionally contoured food product.

46. The method according to claim 1, wherein after the extruding step (b), further comprising mixing the functionally enhanced flour with water at a ratio of 2 parts water to 1 part extruded functionally enhanced flour producing a three-dimensionally formable flour paste that is formed into a three-dimensionally contoured food product that is baked in an oven at a temperature of at least 325 degrees Fahrenheit for at least 5 minutes until uniformly cooked or baked throughout and producing a human-edible food product that is crispy or crunchy.

47. The method according to claim 46, wherein the human-edible food product is one of a chip, a cracker, a roll, and a cookie.

48. The method according to claim 1, wherein after the extruding step (b) further comprising mixing the functionally enhanced flour with water at a ratio of 1 part water to 1 part extruded functionally enhanced flour and producing a three-dimensionally formable dough.

49. The method according to claim 48, wherein the functionally enhanced flour dough has a viscosity of at least 250,000 centipoise.

50. The method according to claim 49, wherein the functionally enhanced flour dough has a viscosity of no more than 1,500,000 centipoise.

51. The method according to claim 49, wherein the functionally enhanced flour dough has a viscosity of between 750,000 centipoise and 1,250,000 centipoise.

52. The method according to claim 49, further comprising forming the three-dimensionally formable dough into a three-dimensionally contoured food product.

53. The method according to claim 52, further comprising baking the three-dimensionally contoured product at a temperature of at least 325 degrees Fahrenheit for at least 5 minutes until uniformly cooked or baked throughout and producing a human-edible food product that is crispy or crunchy.

54. The method according to claim 53, wherein the human-edible food product is one of a chip, a cracker, a roll, and a cookie.

55. The method according to claim 1, wherein the functionally enhanced flour is substantially completely comprised of cold-water soluble starch.

56. The method according to claim 55, wherein the cold-water soluble starch of the functionally enhanced flour is comprised of cold-water soluble amylopectin starch.

57. The method according to claim 1, wherein the functionally enhanced flour is comprised of at least 10% cold-water soluble starch.

58. The method according to claim 1, wherein the extruder is a single screw extruder and during the extruding step (b), the admixture remains within the single screw extruder for a residency time of no longer than about 15 seconds.

59. The method according to claim 58, wherein the functionally enhanced flour has a water activity level, $a_w$, of less than 0.5, and has a shelf life of at least 1 year when packaged in conventional flour packaging and stored at room temperature.

\* \* \* \* \*